United States Patent
Masood et al.

(10) Patent No.: US 12,260,167 B2
(45) Date of Patent: *Mar. 25, 2025

(54) e-PUB CREATOR

(71) Applicant: TRANSFORM SR BRANDS LLC, Hoffman Estates, IL (US)

(72) Inventors: Rafeh Masood, Bartlett, IL (US); Gina Hoffmann, Geneva, IL (US); Chhavi Saxena, Algonquin, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,545

(22) Filed: Feb. 12, 2024

(65) Prior Publication Data
US 2024/0220707 A1     Jul. 4, 2024

Related U.S. Application Data

(63) Continuation of application No. 18/116,754, filed on Mar. 2, 2023, now Pat. No. 11,947,900, which is a continuation of application No. 16/844,153, filed on Apr. 9, 2020, now Pat. No. 11,615,232, which is a continuation of application No. 13/844,814, filed on Mar. 16, 2013, now Pat. No. 10,621,277.

(51) Int. Cl.
| | |
|---|---|
| *G06F 40/151* | (2020.01) |
| *G06F 16/93* | (2019.01) |
| *G06F 40/114* | (2020.01) |
| *G06F 40/166* | (2020.01) |
| *G06F 40/58* | (2020.01) |

(52) U.S. Cl.
CPC ............ *G06F 40/151* (2020.01); *G06F 16/93* (2019.01); *G06F 40/114* (2020.01); *G06F 40/166* (2020.01); *G06F 40/58* (2020.01)

(58) Field of Classification Search
None
See application file for complete search history.

(56) References Cited

U.S. PATENT DOCUMENTS

| | | |
|---|---|---|
| 5,987,461 A | 11/1999 | Dreyer |
| 7,266,767 B2 | 9/2007 | Parker |
| 7,673,234 B2 | 3/2010 | Kao |
| 8,347,205 B2 | 1/2013 | Karim |
| 8,832,047 B2 | 9/2014 | Herbach |
| 8,839,094 B2 | 9/2014 | Nelson |

(Continued)

OTHER PUBLICATIONS

RFC4510, "Lightweight Directory Access Protocol (LDAP): Technical Specification Road Map," K. Zeilenga, Ed., OpenLDAP Foundation, Jun. 2006 (8 pages).

(Continued)

*Primary Examiner* — Keith D Bloomquist
(74) *Attorney, Agent, or Firm* — McAndrews, Held & Malloy, Ltd.

(57) ABSTRACT

A system and method for the preparation of electronic publications or "ePubs" that provide a rich multimedia experience to readers using any of a variety of user devices, without requiring those individuals wishing to prepare such ePubs to install proprietary client applications on the computing device used to prepare the ePubs, and without the need to download a large portion or all of the ePub to enable viewing on an electronic device of an end-user.

20 Claims, 21 Drawing Sheets

(56) References Cited

U.S. PATENT DOCUMENTS

| | | | |
|---|---|---|---|
| 8,938,619 | B2 | 1/2015 | Swaminathan |
| 9,015,159 | B1 | 4/2015 | Page |
| 9,104,647 | B2 | 8/2015 | Artin |
| 9,124,472 | B1 | 9/2015 | Schneider |
| 10,621,277 | B2 | 4/2020 | Masood et al. |
| 2001/0047373 | A1 | 11/2001 | Jones |
| 2002/0116421 | A1 | 8/2002 | Fox |
| 2002/0198904 | A1 | 12/2002 | Robles |
| 2003/0163784 | A1 | 8/2003 | Daniel |
| 2003/0167257 | A1 | 9/2003 | Bonat |
| 2003/0182450 | A1* | 9/2003 | Ong .................. H04L 67/565 707/E17.005 |
| 2004/0039990 | A1 | 2/2004 | Bakar |
| 2004/0044650 | A1 | 3/2004 | Bova |
| 2005/0108023 | A1 | 5/2005 | Hemmings |
| 2005/0120072 | A1 | 6/2005 | Miyazaki |
| 2006/0143561 | A1 | 6/2006 | Balasubramanyan |
| 2006/0162071 | A1 | 7/2006 | Dixon |
| 2006/0224720 | A1 | 10/2006 | Bhogal |
| 2006/0230030 | A1* | 10/2006 | Volpa .................. G06F 16/9577 709/215 |
| 2007/0027672 | A1 | 2/2007 | Decary |
| 2007/0214218 | A1 | 9/2007 | Ward |
| 2007/0289022 | A1 | 12/2007 | Wittkotter |
| 2007/0291297 | A1 | 12/2007 | Harmon |
| 2008/0097972 | A1 | 4/2008 | Gordon |
| 2008/0183699 | A1 | 7/2008 | Hu |
| 2009/0030620 | A1 | 1/2009 | Novo |
| 2009/0300485 | A1 | 12/2009 | Feinberg |
| 2009/0313331 | A1 | 12/2009 | Rasmussen |
| 2010/0115424 | A1 | 5/2010 | Young |
| 2011/0010297 | A1 | 1/2011 | Sisodraker |
| 2011/0026708 | A1 | 2/2011 | Oonuma |
| 2011/0072390 | A1 | 3/2011 | Duga |
| 2011/0157609 | A1 | 6/2011 | Brady |
| 2011/0169860 | A1 | 7/2011 | Ito |
| 2011/0225119 | A1 | 9/2011 | Wong |
| 2011/0296291 | A1 | 12/2011 | Melkinov |
| 2011/0296321 | A1* | 12/2011 | Lord .................. G06Q 10/10 707/769 |
| 2012/0137200 | A1 | 5/2012 | Shar |
| 2012/0151379 | A1 | 6/2012 | Schultz |
| 2012/0240039 | A1 | 9/2012 | Walker |
| 2013/0024475 | A1* | 1/2013 | Sappey .............. G06F 16/24575 707/771 |
| 2013/0067313 | A1 | 3/2013 | Leguin |
| 2013/0080869 | A1 | 3/2013 | Le Henaff |
| 2013/0124649 | A1 | 5/2013 | Triantos |
| 2013/0151231 | A1 | 6/2013 | Giraudy |
| 2013/0151940 | A1 | 6/2013 | Bailor |
| 2013/0159823 | A1 | 6/2013 | Ri |
| 2013/0159849 | A1 | 6/2013 | Lee |
| 2013/0179761 | A1 | 7/2013 | Cho |
| 2013/0191728 | A1 | 7/2013 | McKinney |
| 2013/0212121 | A1 | 8/2013 | Perelman |
| 2013/0227271 | A1 | 8/2013 | Pampagnin |
| 2013/0290465 | A1 | 10/2013 | Harrison |
| 2014/0032488 | A1 | 1/2014 | McAfee |
| 2014/0033027 | A1 | 1/2014 | Polo |
| 2014/0040612 | A1 | 2/2014 | Swaminathan |
| 2014/0040714 | A1* | 2/2014 | Siegel .................. G06F 40/103 715/203 |
| 2014/0115446 | A1 | 4/2014 | Hall |
| 2014/0156255 | A1 | 6/2014 | Le Chevalier |
| 2014/0157105 | A1 | 6/2014 | Plesnicher |
| 2014/0164915 | A1 | 6/2014 | Liu |
| 2014/0168666 | A1 | 6/2014 | Sakurai |
| 2014/0188585 | A1 | 7/2014 | Thompson, Jr. |
| 2014/0214503 | A1 | 7/2014 | Chircorian |
| 2014/0215303 | A1 | 7/2014 | Grigorovitch |
| 2014/0215391 | A1 | 7/2014 | Little |
| 2014/0245221 | A1 | 8/2014 | Dougherty |
| 2014/0281850 | A1 | 9/2014 | Prakash |
| 2014/0337279 | A1 | 11/2014 | Mo |
| 2015/0006552 | A1 | 1/2015 | Lord |
| 2015/0199307 | A1 | 7/2015 | Zhang |
| 2015/0234792 | A1 | 8/2015 | Boenau |
| 2016/0140093 | A1 | 5/2016 | Block |
| 2016/0246893 | A1 | 8/2016 | Codignotto |
| 2016/0352755 | A1 | 12/2016 | Swaminathan |
| 2017/0083871 | A1 | 3/2017 | Chang |
| 2018/0144054 | A1 | 5/2018 | Ramanathan |

OTHER PUBLICATIONS

Website providing information about "eMagStudio" software product from Papeer International ApS, Copengagen, Denmark, viewed online at <http://www.emagcreator.com/> on Dec. 18, 2012.
Website providing information about "Alfresco" software product from Alfresco Software, Inc., Maidenhead, UK, viewed online at <http://www.alfresco.com/> on Dec. 18, 2012.
Website providing information about Adobe Portable Document Format (PDF) from Adobe Systems Incorporated, San Francisco, CA, viewed online at <http://www.adobe.com/products/acrobat/adobepdf.html> on Dec. 18, 2012.
Information about Calibre e-Book Management open source software tool from developer Kovid Goyal, (address unknown), viewed online at <http://calibre-ebook.com/> on Oct. 5, 2013.
Beer et al., Smart Books—Adding Context-awareness and Interaction to Electronic Books, ACM 2011, pp. 218-222.
Pallis et al., Insight and Perspectives for Content Delivery Networks, ACM 2006, pp. 101-106.
Hailey et al., Best Tool for the Job: How to Select an Appropriate eBook Format, IEEE 2012, pp. 1-3.
Kircz, New Practices for Electronic Publishing 1: Will the Scientific Paper Keep Its Form?, Learned Publishing 2001, pp. 265-272.
Frankel et al., Defining and Certifying Electronic Publication in Science, Learned Publishing 2000, pp. 251-258.
Fetterly et al., On the Evolution of Clusters of Near-Duplicate Web Pages, IEEE 2003, pp. 1-9.
Sara-Meshkizadeh et al., Webpage Classification based on Compound of Using HTML Features & URL Features and Features of Sibling Pages, Citeseer 2010, pp. 36-46. 2020.
Boiko, Underanding Content Management, Wiley Online Library 2001, pp. 8-12. 2001.
Craft, Portable Document Format (PDF): Standardizing Document Files for Publication, DESIDOC 2003, pp. 19-24 (Year: 2003).
Aura et al., Scanning Electronic Documents for Personally Identifiable Information, ACM 2006, pp. 41-49 (Year: 2006).
Matsukata et al., International Edition of IAA Multilingual Dictionary Coordinated through Computer Network, Elsevier Science 2002, pp. 95-101.
Carliner, Possible Impacts of the New Popularity of E-Books on Higher Education, Google 2010, pp. 1-8.

* cited by examiner

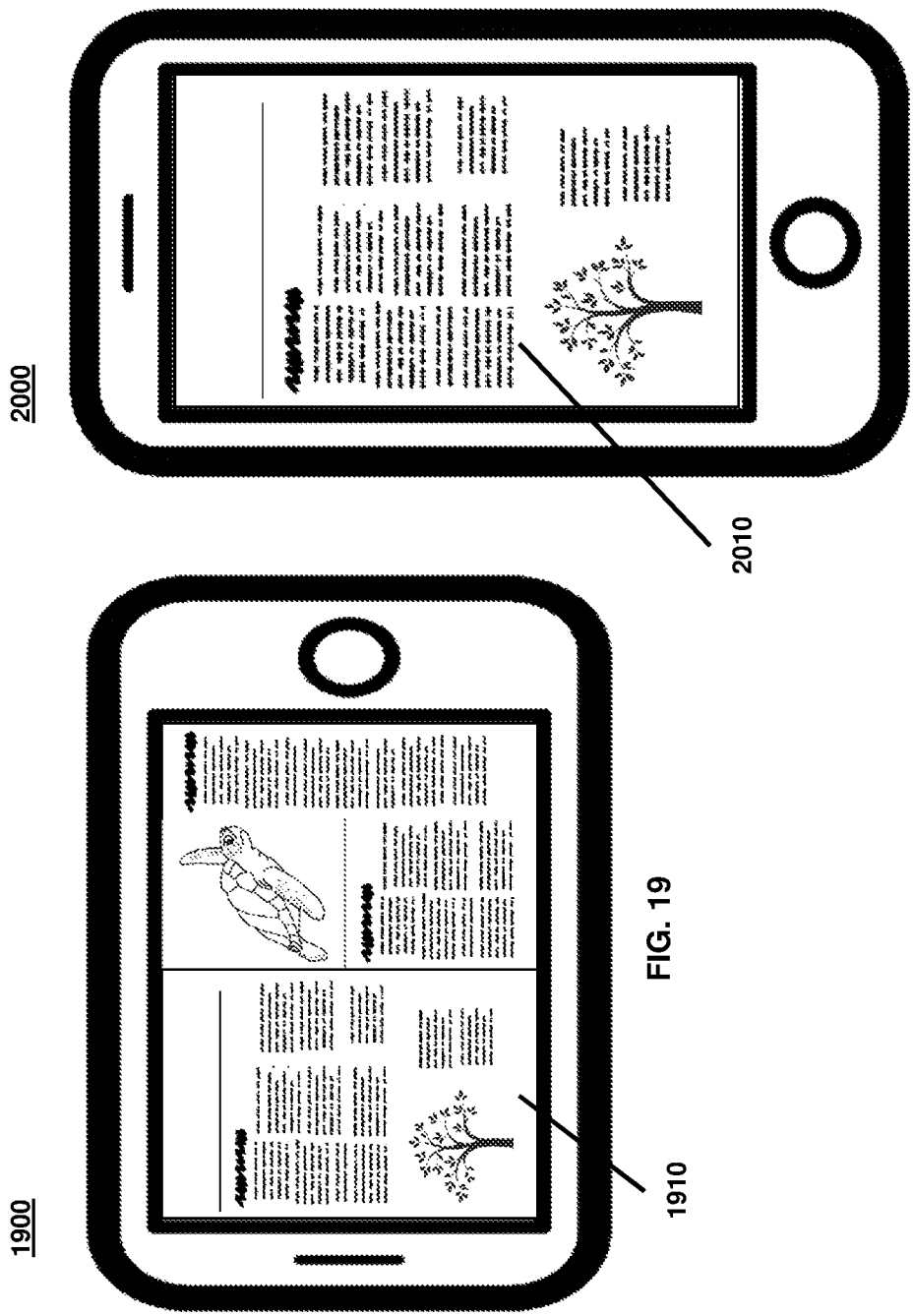

e-PUB CREATOR

The present application is a continuation of U.S. application Ser. No. 18/116,754, filed Mar. 2, 2023, which is a continuation of U.S. application Ser. No. 16/844,153, filed Apr. 9, 2020 (U.S. Pat. No. 11,615,232), which is a continuation of U.S. application Ser. No. 13/844,814, filed Mar. 16, 2013 (U.S. Pat. No. 10,621,277). Each of the above-referenced applications is hereby incorporated herein by reference in its entirety.

FIELD OF THE INVENTION

Certain embodiments of the present invention relate to systems and methods that support the production of electronic publications (e-Pubs). More specifically, certain aspects of the present invention relate to systems and methods for the preparation of electronic publications or "ePubs" that provide a rich multimedia experience to readers using any of a variety of user devices, without requiring those individuals wishing to prepare such ePubs to install proprietary client applications on the computing device used to prepare the ePubs, and without the need to download a large portion or all of the ePub to enable viewing on an electronic device of an ePub author or end-user.

BACKGROUND OF THE INVENTION

Many personal electronic devices, most notably the iPad, iTouch, and iPhone from Apple, Inc., do not have native support for the playback of media content that is Adobe Flash®-based, which means that electronic publications that include Adobe Flash®-based content are not available for viewing by users of those mobile devices. Some of the available solutions for generating electronic publications require that a software application be resident on the computer of the user wishing to create an ePub, which may create significant additional work for system administrators. Existing solutions for the production of electronic publications may also fail to provide integrated support for the production, management, and delivery of multiple language-specific versions of an electronic publication, may not produce electronic publications that are searchable from within content management systems of the type used to distribute published electronic publications, and may involve the downloading and installation of a brief summary of the invention software application to enable the end-user to view an ePub. In addition, some electronic publications must be downloaded in their entirety, which can delay the start of viewing by the end-user, and unnecessarily consume significant amounts of valuable network bandwidth.

Further limitations and disadvantages of conventional and traditional approaches will become apparent to one of skill in the art, through comparison of such systems with some aspects of the present invention as set forth in the remainder of the present application with reference to the drawings.

A system and/or method for producing an electronic publication or "ePub", substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 19 is an illustration of an example display screen image showing the appearance of an ePub as rendered on a display of a tablet computer from data (e.g., HTML 5 content) produced by the ePub viewer functionality of FIG. 2, in accordance with a representative embodiment of the present invention.

FIG. 20 is an illustration of an example display screen image showing the appearance of an ePub as rendered on a display of a smart phone from data (e.g., HTML 5 content) produced by the ePub viewer functionality of FIG. 2, in accordance with a representative embodiment of the present invention.

DETAILED DESCRIPTION OF THE INVENTION

Figure 1:
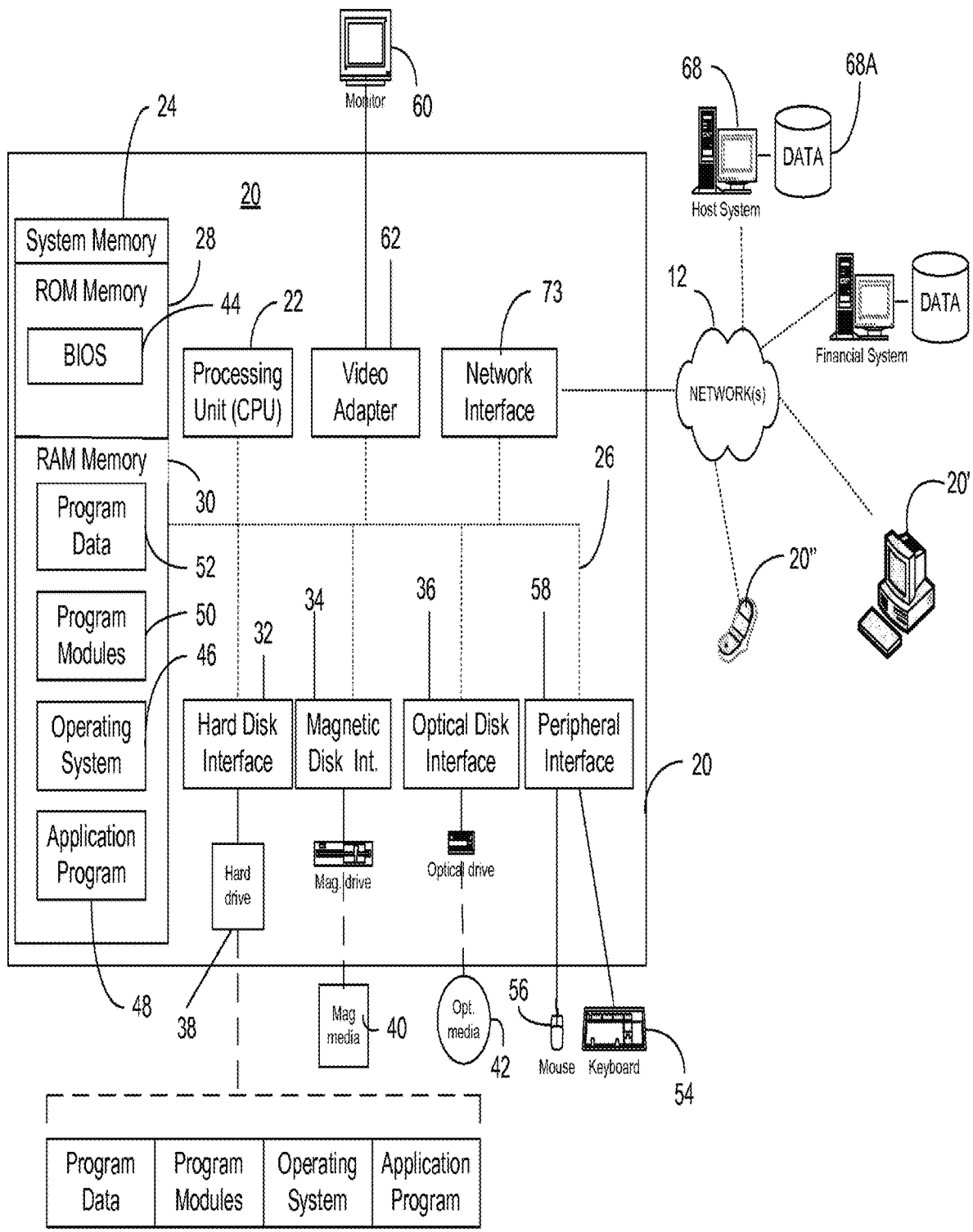
FIG. 1 is an illustration of computer network, in which a representative embodiment of the present invention may be practiced.

Aspects of the present invention relate to systems and methods used to support the production of electronic publications. More specifically, certain aspects of the present invention relate to systems and methods for the preparation of electronic publications or "ePubs" that provide a rich multimedia experience to readers using any of a variety of user devices, without requiring those individuals wishing to prepare such ePubs to install proprietary client applications on the computing device used to prepare the ePubs, and without the need to download a large portion or all of the ePub to enable viewing on an electronic device of an ePub author or end user.

The following description of example methods and apparatus is not intended to limit the scope of the description to the precise form or forms detailed herein. Instead the following description is intended to be illustrative so that others may follow its teachings.

Various aspects of a representative embodiment of the present invention are described below in terms of an example "ePub creator" application. In a representative embodiment of the present invention, an ePub producer user may, for example, wish to make new or existing product advertising and sales literature, user guides, product technical and service manuals, and other types of information available to sales associates and/or customer services agents via end-user devices such as, for example, desktop or laptop personal computers, notebook computers, netbook computers, tablet computers, handheld smart phones, pocket-size audio and/or video media players, and other personal intelligent mobile devices. A representative embodiment of the present invention may permit the ePub producer to easily and quickly convert new or existing materials into rich multimedia content suitable for access and display using, for example, a web browser application present on most of the types of personal intelligent devices listed above. A representative embodiment of the present invention may be, for example, particularly well suited for use by customer service agents or sales associates in a retail environment, enabling them to quickly and efficiently respond to customer questions and needs related to product features, reviews, availability, compatibility, financing, installation, use, repair, and other concerns.

Related U.S. patent application Ser. No. 13/483,959, entitled "Methods And Systems For Connected Sales Associate Services," filed May 30, 2012, which is hereby incorporated herein by reference in its entirety, describes a system that provides for mobile device connectivity for a sales associate to access various retail systems, to enable the sales associate to provide a customized and personal shopping experience for multiple customers while maintaining their own retail location mobility. Representative embodiments of the inventive mobile application concepts disclosed in U.S. patent application Ser. No. 13/483,959 may be used, by way of example and not limitation, a "sales associate" or "customer service agent," to access electronic publications prepared using a representative embodiment of the present application.

A system in accordance with a representative embodiment of the present invention provides for the use of commodity hardware, off the shelf software, OS independent applications, form factor independent devices (PC, tablets, smart phones etc), media independent (voice, text, video) and cloud based infrastructure to run all functionalities of the present system. In the context of a service establishment, such as, for example, a retail store this is specifically very useful as a customer can utilize familiar technologies and receive relate and personalized support, assistance, product demos, suggestions, etc., which can be handled by a sales associate or customer service agent who has the most expertise and relevant information and who are located proximate to the customer (e.g., on a sales floor, at a business location near the location of the customer, and/or can be handled by the consumer's social network.

In the following discussion, the terms "customer service agent" and "sales associate" may be used herein interchangeably to refer to an employee or other individual who provides product and/or sales related assistance to customers of a business. The sales associate or customer service agent may be, by way of example and not limitation, an expert, question and answer provider, merchandise associate, etc. The term "customer" may be used herein to refer to a potential or existing purchaser of products and/or services of a business. The term "channel" in the present context may refer to various means of communicating such as, for example, online communication (e.g., Internet-based), mobile communication (e.g., wireless communication such as cellular or Wi-Fi), and in-store communication. The term "personal shopper" may be used herein to refer to an individual that provides product information, recommendations, and/or purchase assistance to members of their own social network or others under the guidance and/or with the assistance of the operators of a commercial retail business. The term "human readable language" may be used herein to refer to the written form of a natural language.

As utilized herein, the terms "exemplary" or "example" means serving as a non-limiting example, instance, or illustration. As utilized herein, the term "e.g." introduces a list of one or more non-limiting examples, instances, or illustrations.

The disclosed methods and systems may be part of an overall shopping experience system created to enhance the consumer shopping event. In one example, the disclosed system may be integrated with the customer's reward system, the customer's social network (e.g., the customer can post their shopping activity conducted through the system to their social network), the customer's expert system, digital/mobile applications, shopping history, wish list, location, merchandise selections, or the like. However, the system disclosed may be fully and/or partially integrated with any suitable shopping system as desired, including those not mentioned and/or later designed.

With reference to the figures, and in particular with respect to the exemplary computer network 100 of FIG. 1, the following discloses various example systems and methods for generating or producing and delivering electronic publications or "ePubs" via a computer network, to a handheld or mobile device such as those described above. To this end, a processing device 20", illustrated in the exemplary form of a mobile communication device, a processing device 20', illustrated in the exemplary form of a computer system, and a processing device 20 illustrated in schematic form, are provided with executable instructions to, for example, provide a means for a customer, e.g., a user, consumer, etc., or a sales associate, a customer service agent, and/or others to access a host system server 68 and, among other things, be connected to a content management system, an electronic publication system, a hosted social networking site, a user profile, and/or a sales associate. Generally, the computer executable instructions reside in program modules which may include routines, programs, objects, components, data structures, etc. that perform particular tasks or implement particular abstract data types. Accordingly, the processing devices 20, 20', 20" illustrated in FIG. 1 may be embodied in any device having the ability to execute instructions such as, by way of example, a personal computer, mainframe computer, personal-digital assistant ("PDA"), cellular telephone, tablet, e-reader, smart phone, or the like. Furthermore, while described and illustrated in the context of a single processing device 20, 20', 20", the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices are typically connected to the processing unit 22 by means of an interface 58 which, in turn, is coupled to the bus 26. Input devices may be connected to the processor 22 using interfaces such as, for example, a parallel port, game port, FireWire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. In this regard, while the host system server 68 has been illustrated in the exemplary form of a computer, the host system server 68 may, like processing device 20, be any type of device having processing capabilities. Again, the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, media content providers, document storage systems, etc.

For performing tasks as needed, the host system server 68 may include many or all of the elements described above relative to the processing device 20. In addition, the host system server 68 would generally include executable instructions for, among other things, coordinating storage and retrieval of documents, social network storage of a shopping list, receiving a location of a customer via a mobile device, receiving a request for a service call center connection from either a customer or a sales associate, routing the request via a distributed mobile video call center, providing a service call infrastructure for providing the requestor with a distributed customer service experience.

Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, program modules depicted relative to the processing device 20, or portions thereof, may be stored in the non-transitory memory storage device(s) of the host system server 68.

A representative embodiment of the present invention may be used to produce and make available for retrieval, electronic publications referred to herein as "ePubs." Such ePubs may be, for example, product and/or service catalogues, advertisements, brochures, and design, service, and maintenance documentation available in a form of rich-content accessible via various types of end-user mobile/tablet/laptop/desktop devices, such as those described above. The ePubs may be stored, for example, in a file store, or a Content Management System (CMS) that may act as a back end where all documents including, for example, created ePubs and source materials (e.g., portable document format (PFD) files) that may be used to create ePubs, are stored. A representative embodiment of the present invention may support search of the electronic publications within a collection of ePubs, and may provide an index preview capability. Searching of stored ePubs may be performed from within the content management system, or may be done using a user interface of a system separate from the CMS, via which ePubs may be created and managed in the same manner as when using a web-based interface. In a representative embodiment of the present invention, the CMS may support a number of services that may be used, for example, by ePub creator functionality such as, services for updating a universal resource locator (URL) link of a CMS content type based upon a document identifier, and services for identifying and/or fetching documents that expire within a given date range. Services that support new contents types for ePubs and support menu access to ePub creation functionality.

A representative embodiment of the present invention may permit a user to embed multimedia content (e.g., video, audio, or text) and/or links to additional media content sources and/or other pages within the ePub, and may provide support for the production and linking/association of multiple, related ePubs in different human readable languages, enabling seamless integration and support of multilingual ePub production and distribution. A representative embodiment may also track and manage the assignment, progress, or "workflow" of an ePub from creation, through translation (when appropriate), publication, removal from publication, archiving, and deletion. A representative embodiment of the present invention may permit multiple versions of an ePub to co-exist, and may permit only one version of an ePub to be the "published" version. The term "published" may be used herein to refer to an ePub that has been made available for delivery to one or more end-user mobile/tablet/laptop/desktop device(s) for rendering and viewing by the intended end-user(s) of the ePub, while the terms "non-published," "un-published," or "in-progress" may be used to refer an ePub in the process of being prepared, edited/modified, or having been removed from publication.

In a representative embodiment of the present invention, when multiple nonpublished versions of an ePub co-exist, each non-published version of the ePub may be assigned a unique "in-progress" identifier such as, for example, a unique universal resource locator (URL), while the identifier assigned to the one published version may remain the same from one published version to another. This approach permits the end-user(s)/viewer(s) of the ePub to bookmark the identifier (e.g., URL) for the published version, enabling the end-user to always access the most recent published version of the ePub.

Some representative embodiments of the present invention may operate independent from a CMS, and may be usable without a content management system. Other representative embodiments of the present invention may have CMS and ePub creation and management functionality seamlessly integrated, permitting a user to access the ePub creation and editing functionality from within the user interface of the CMS, along with the capabilities to, for example, "publish," "un-publish," "archive," and "delete" ePubs. This may be enabled through the use of application programming interfaces (APIs) that expose ePub creation, editing, and management functionality of an "ePub Creator" portion of the system to a CMS portion of the system, and may likewise expose content management functionality of the CMS portion to the "ePub Creator" portion. For example, the "ePub Creator" portion may provide API access to functionality that supports ePub creation and storage in a file store, deletion of ePubs from the file store, and management of ePubs such as, for example, deletion of content, providing information identifying available ePub, archiving of ePub(s).

In some representative embodiments of the present invention, the capabilities described herein may be implemented as a software application that is entirely web based. That is, a user may access such ePub creation and management functionality via the Internet or an intranet network using, for example, a personal computer (PC) and web browser software, and may not be required to have a software application specific to ePub creation and management, or for viewing an ePub present on their PC in order to create, edit, manage, or view an ePub. Such a web-based embodiment may have functionality that includes the ability to edit ePubs, including the insertion, modification, and removal of multimedia content (e.g., video, still pictures, audio, and/or text) and links that are embedded within the ePub. Such a web-based embodiment may also include ePub "viewer" functionality that accesses published ePubs from, for example, a CMS or file store, and that delivers the published ePub to an end-user mobile/tablet/laptop/desktop device for rendering and viewing using a web browser.

An ePub created using a representative embodiment of the present invention may be delivered to the mobile/tablet/ laptop/desktop device of an end-user as a series of individual pages, on demand, and the user may move from page to page in a natural, book-like manner. This may be supported using functionality supported by, for example, the hypertext markup language (HTML) 5 standard. In this manner, the amount of data sent to the end-user mobile/tablet/laptop/ desktop device, and the time and bandwidth required to support access to and viewing of ePubs may be minimized.

Figure 2:
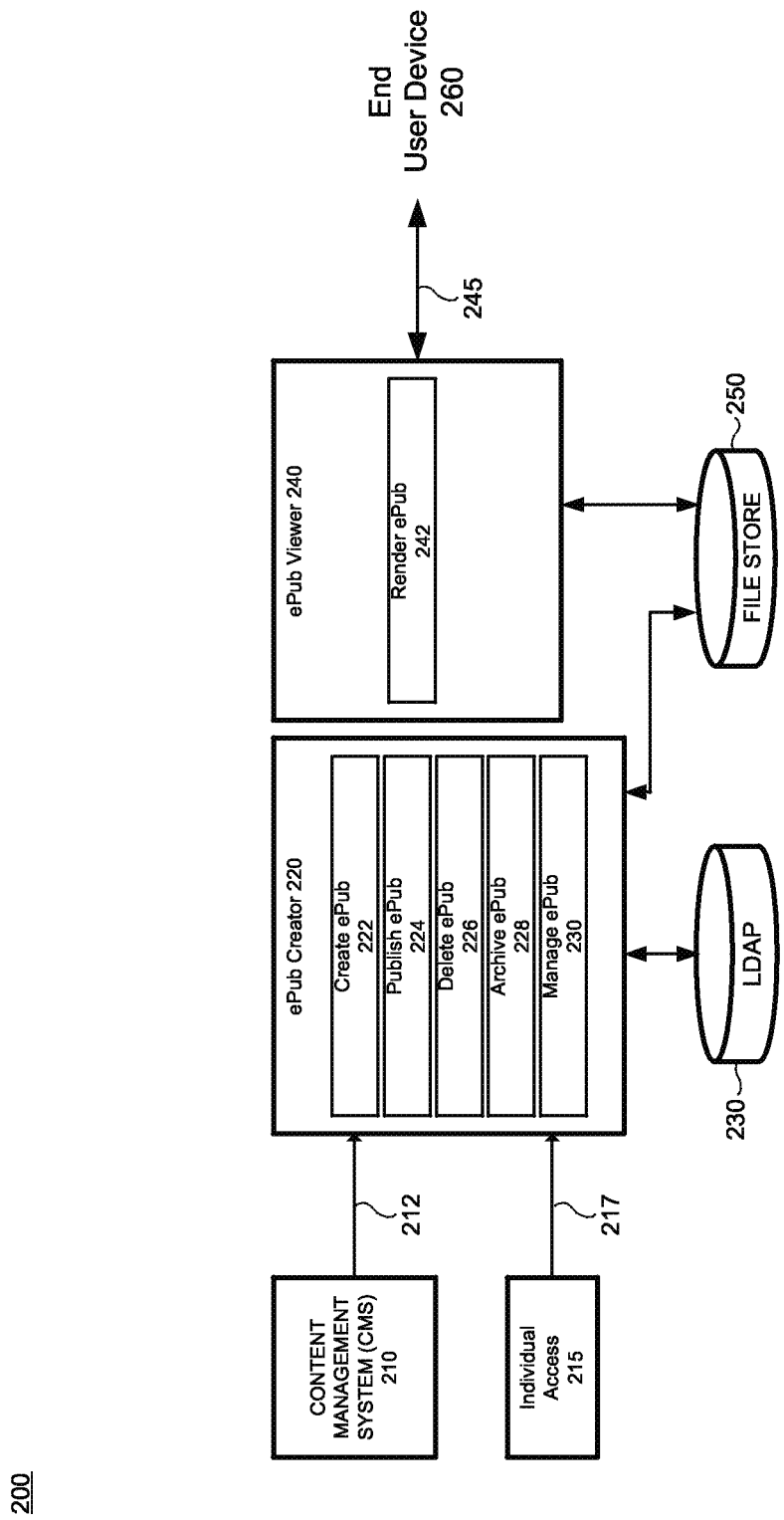
FIG. 2 is a block diagram illustrating an exemplary electronic publication ("ePublication" or "ePub") system, in accordance with a representative embodiment of the present invention.

FIG. 2 is a block diagram illustrating an exemplary electronic publication ("ePublication" or "ePub") system 200, in accordance with a representative embodiment of the present invention.

The exemplary ePub system 200 of FIG. 2 comprises a content management system (CMS) 210, ePub creator functionality 220, ePub viewer functionality 240, a lightweight directory access protocol (LDAP) 230, and a file store 250. Although the illustration of FIG. 2 shows these elements with a particular partitioning of the functionality as described herein, this is by way of example and not limitation, as the number of elements and partitioning of the functionality of the elements of an ePub system in accordance with a representative embodiment of the present invention may be arranged in other ways suitable to perform the operations for preparing, customizing, and managing ePubs. The individual elements of the ePub system 200 identified above will now be described in greater detail.

The CMS 210 of FIG. 2 is used to store various documents in electronic form, to enable the management, sharing, and tracking of such documents. One example CMS that may be suitable for use in a representative embodiment of the present invention is Alfresco®, an open source content management platform from Alfresco Software, Ltd. The CMS 210 of FIG. 2 may include a user interface suitable for use by a content creator user who wishes to create new ePub content, to modify existing ePub content, and to manage the lifecycle of ePubs stored via the CMS 210. The user interface of the CMS 210 may be accessible via, for example, any suitable communication wired or wireless communication network. The CMS 210 may, for example, provide for customization of its functionality through the use of scripts, code, executable instructions, plug-ins, add-ins, or other techniques, to enable the CMS 210 to provide a suitable user interface to communicate with the user of the CMS, and to communicate with ePub creator functionality 220, or other elements of the ePub system 200 via any suitable communication paths such as communication path 212. As also shown in FIG. 2, a user of the ePub system 200 may communicate directly with the ePub creator functionality 220 via communication path 217.

As previously described above, the ePub creator functionality 220 of a representative embodiment of the present invention may host a set of services that support the creation, customization, modification, deletion, archiving, publication, and un-publication of ePub documents. FIG. 2 shows an example partitioning of functionality as a "create ePub" service 222, a "publish ePub" service 224, a "delete ePub" service 226, an "archive ePub" service 228, and a "manage ePub" service 230. In a representative embodiment of the present invention, such services may be accessible to the CMS 210 via a suitable application programming interface (API) via communication path 212 such as, for example, one that supports one or more service calls, which may be, for example, an API referred to herein as a RESTful (representational state transfer (REST)) architecture API call.

The ePub viewer functionality 240 of the ePub system 200 acts as an interface between the end-user 260 and ePubs stored in the file store 250 by the ePub creator functionality 220. In a representative embodiment of the present invention, the ePub viewer functionality 240 allows the end-user to access ePubs created by the ePub creator functionality 220 and stored in the file store 250. The ePub viewer functionality 240 may comprise render ePub functionality 242 that accesses an ePub stored in the file store 250 and renders the ePub in a form understood by the capabilities of the enduser mobile/tablet/laptop/desktop device 260. In some representative embodiments of the present invention, the render ePub functionality 242 may communicate ePub content from the file store 260 in a page by page fashion at the request of the user (i.e., on demand), by encoding the pages of the ePub as hypertext markup language (HTML) 5 encoded web pages, which are then interpreted by compatible browser software in the end-user mobile/tablet/laptop/ desktop device 260. The communication path 245 that links the end-user mobile/tablet/laptop/desktop device 260 to the ePub viewer functionality 240 may comprise, for example, wired and/or wireless local area or wide area communication networks such as, for example, one or more of an IEEE 802.3 wired network, an IEEE 802.11 a/b/g/n/ac network, a cellular network, and/or a WiMAX network, or any suitable communication network known now or in the future.

The lightweight directory access protocol (LDAP) functionality 230 of FIG. 2 is used to determine which users have permissions to create new e-Pubs and which users have the required permissions to archive, publish, or delete e-Pubs. The permissions are controlled by the roles associated with the users in the LDAP functionality 230.

Figure 3:
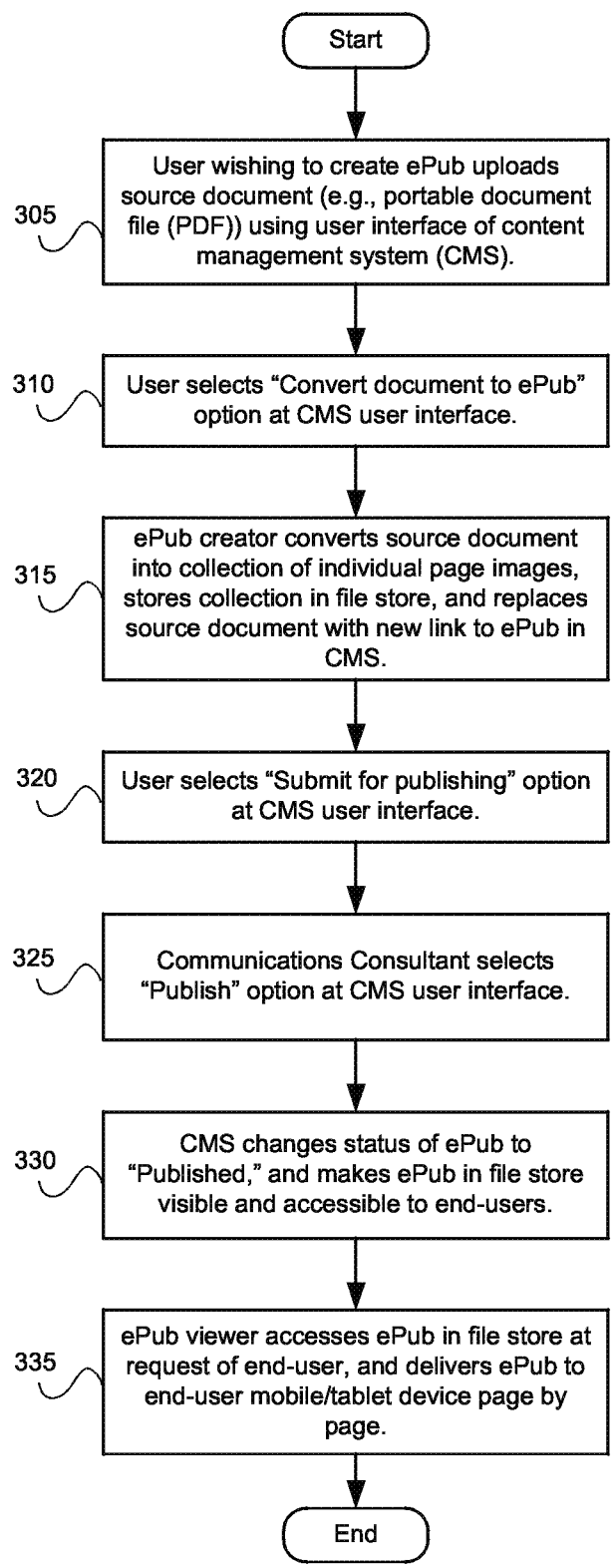
FIG. 3 is a flowchart illustrating the actions performed in an example method of creating an electronic publication or ePub, in accordance with a representative embodiment of the present invention.

FIG. 3 is a flowchart 300 illustrating the actions performed in an example method of creating an electronic publication or ePub, in accordance with a representative embodiment of the present invention. The following description makes reference to elements of FIG. 1 and FIG. 2. In the example of FIG. 3, an individual at the user interface of a CMS such as the CMS 210 of FIG. 2 wishes to create an ePub. It should be noted that equivalent actions may also be performed using, for example, the user interface for individual access 215 that permits the user to directly access the ePub creator functionality 220.

The method of FIG. 3 begins at block 305, where the user begins by uploading a source document such as, for example, a portable document format (PDF) document, to a content management system such as the CMS 210 of FIG. 2. In the example of FIG. 3, the user interface of the CMS 210 has been augmented to include user interface (UI) elements that permit control of ePub creator functionality such as that of the ePub Creator functionality 220 of FIG. 2, from the CMS 210.

Next, at block 310, the user selects a UI element of the CMS, which causes the CMS 210 to communicate with the ePub creator functionality 220 via communication path 212, as described above, to request the conversion of the source document. At block 315, the ePub creator functionality 220 then converts the source document into an ePub by processing the source document to produce a collection of data comprising an image of each page of the source document, text content of each page of the source document, and other information. Such processing may comprise splitting or parsing the source document. The collection of data for the ePub is then stored, for example, in a file store such as the file store 250 of FIG. 2. The ePub creator functionality 220 then communicates via the communication link 212, requesting that the CMS replace the source document (e.g., a PDF file) in CMS with a new link to the just-created ePub.

Next, the method of FIG. 3 moves to block 320, at which the user authoring the ePub selects the UI element of the CMS to submit the ePub for publication, causing the ePub to be routed to a "communication consultant" that may review the ePub before it is made available to end-users. When review of the ePub is completed, at block 325, the communications consultant may indicate to the CMS 210 that the ePub is to be published using, for example, a UI element of the CMS 210. Next, at block 330, the CMS modifies the status of the ePub to set the ePub status to "Published," and makes the ePub in the file store (e.g., file store 250) visible and accessible to end-users (e.g., those using end-user devices 260). End-users at respective end-user devices 360 may then, at block 335, access the published ePub over any of the communication networks described above using the ePub viewer functionality 240 in a page-by-page or other manner involving portions of the ePub.

Figure 4:
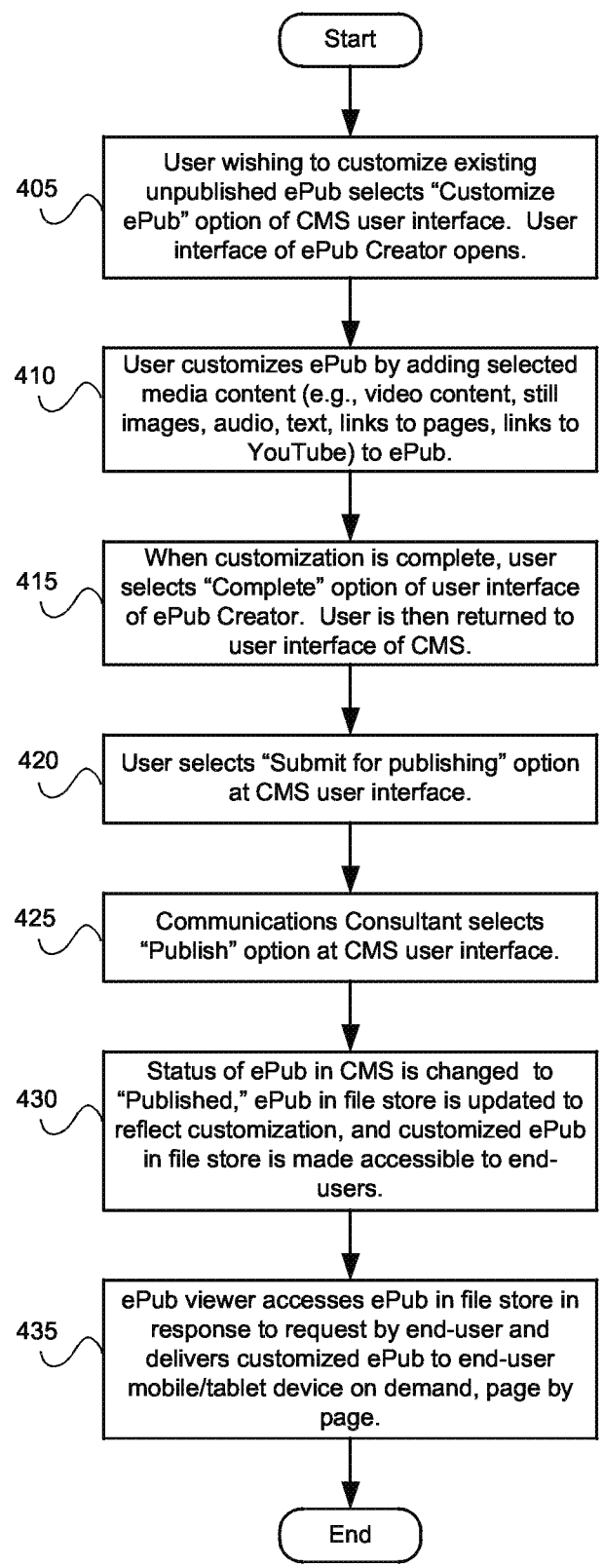
FIG. 4 shows a flowchart illustrating the actions performed in an example method of customizing an electronic publication or ePub such as that created by the method illustrated in the flowchart of FIG. 3, in accordance with a representative embodiment of the present invention.

FIG. 4 shows a flowchart 400 illustrating the actions performed in an example method of customizing an electronic publication or ePub such as that created by the method illustrated in the flowchart 300 of FIG. 3, in accordance with a representative embodiment of the present invention. Customization of an ePub may comprise, for example, the insertion of UI elements to permit access to media content such as one or more of video, still images, audio, and links to content sources such as, for example, YouTube®. The following description makes reference to elements of FIG. 1 and FIG. 2. In the example of FIG. 4, an individual at the user interface of a CMS such as the CMS 210 of FIG. 2 wishes to customize an unpublished, previously created ePub. It should again be noted that actions that result in an outcome similar to that described below may also be performed using, for example, the user interface for individual access 215, which permits the user to access the features of ePub creator functionality 220 directly.

The method illustrated in FIG. 4 starts at block 405, where a user wishing to customize an existing, unpublished ePub selects an associated UI element of the CMS 210, to enable user access to the ePub customization capabilities of, for example, the ePub Creator functionality 220 of FIG. 2. In some representative embodiments of the present invention, user selection of a "customize" option may cause the CMS 210 to communicate with the ePub creator functionality 220 via the communication path 212, as described above, activating the user interface of the ePub creator functionality 220.

Next, at block 410, the user may customize the ePub by adding to one or more pages of the ePub, end-user selectable links to media content such as, for example, digital representations of one or more of video content, still images, audio content, and/or links to external media content sources such as YouTube®, or to other pages of the ePub. When the customization of the ePub has been completed, the user of the ePub system then selects an element of the user interface to indicate completion, the customized ePub is stored in the file store (e.g., file store 250), and the user is then returned to the user interface of the CMS 210. In a representative embodiment of the present invention, the user may then, at block 420, submit the customized ePub for publishing, which may cause the customized ePub to be routed to a "communication consultant" for review, before the ePub is made available to end-users.

When review of the ePub by the communication consultant is completed, the communications consultant may, at block 425, indicate to the CMS 210 that the ePub is to be published using, for example, a corresponding UI element of the user interface of the CMS 210. The CMS then, at block 430, updates the status of the customized ePub to show that the ePub has been "Published," the ePub in the file store (e.g., file store 250) is updated to reflect the customization, and the CMS 210 causes the published ePub in the file store to be made visible and accessible to end-users (e.g., those using end-user devices 260). End-users at respective end-user devices 360 may then, at block 435, access the published ePub over any of the communication networks described above, via the ePub viewer functionality 240, in a page-by-page or other manner involving portions of the ePub.

Figure 5:
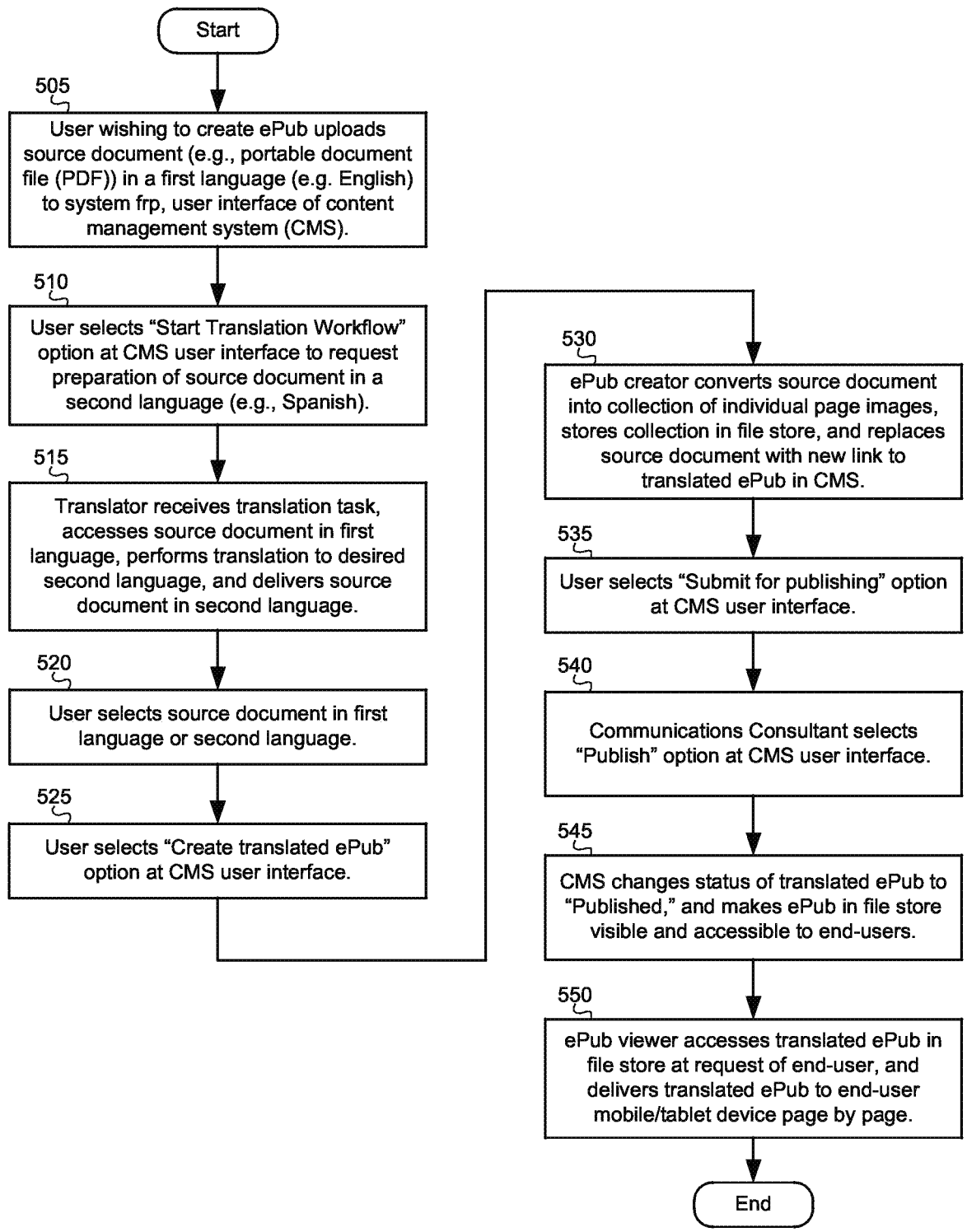
FIG. 5 is a flowchart that illustrates actions performed in an example method of handling production of an electronic publication or ePub from common content to be published as separate versions in each of two or more different human readable languages, in accordance with a representative embodiment of the present invention.

FIG. 5 is a flowchart 500 that illustrates actions performed in an example method of handling production of an electronic publication or ePub from common content to be published as separate versions in each of two or more different human readable languages, in accordance with a representative embodiment of the present invention. In a representative embodiment of the present invention, the production of two or more ePubs in different human readable language versions may involve storing information associating or linking the various language versions, to enable the content of the various language versions to be maintained in unison. The following description makes reference to elements of FIG. 1 and FIG. 2. In the example of FIG. 5, an individual at the user interface of a CMS such as the CMS 210 of FIG. 2 wishes to create an ePub to be available in two or more human readable languages. As previously noted, although reference is made to the use of a user interface on a content management system such as the CMS 210, actions that result in an outcome similar to that described below may also be performed using, for example, the user interface for individual access 215, which permits the user to access the features of ePub creator functionality 220 directly.

The method of FIG. 5 begins at block 505. There, a user wishing to create an ePub to be available for distribution to end-users in multiple languages uploads a source document (e.g., a PDF document) in a first language to a content management system such as the CMS 210. In the example of FIG. 5, the first language may, for example, be English. The user then, at block 510, may select an associated UI element of the CMS 210, to indicate that the user wishes to begin workflow for translation of the source document from the first human readable language to a second human readable language (e.g., Spanish). The user selection causes a translation task to be sent to an appropriate translator selected based on the first and second languages. In some representative embodiments of the present invention, the translator may be human, while in others the translator may be computer-based. The selected translator then receives the translation task, at block 515, accesses the source document in the first language, performs translation of the source document from the first language to the second language, and delivers the source document in the second language back to the ePub system 200 via the CMS 210, which tracks the assignment and completion of the translation.

Next, at block 520, the user of the ePub system 200 selects the source document in the first or second human readable language that is to be used for production of an ePub in the respective language and, at block 525, selects an element of the user interface to cause the ePub creator functionality 220 to create a translated ePub from the selected source document. At block 530, the ePub creator functionality 220 then converts the selected source document into an ePub by processing the selected source document to produce a collection of data comprising an image of each page of the source document, text content of each page of the source document, and other information. The collection of data for the ePub is then stored, for example, in a file store such as the file store 250 of FIG. 2. The ePub creator functionality 220 then communicates with the CMS 210 via the communication link 212, requesting that the CMS replace the source document in CMS with a new link to the just-created ePub.

The method of FIG. 5 next moves to block 535, where the user authoring the ePub selects the UI element of the CMS to request that the ePub be published. This causes the ePub to be routed to a "communication consultant" that may review the ePub before it is made available to end-users. When review of the ePub is completed then, at block 540, the communications consultant may indicate to the CMS 210 that the ePub is to be published using, for example, a user interface element of the CMS 210. The CMS then, at block 545, modifies the status of the ePub to show the ePub status as "Published," and causes the ePub in the file store (e.g., file store 250) to be made visible and accessible to end-users (e.g., those using end-user devices 260). The endusers may then, at block 550, access the published ePub using an end-user device 360 over any of the communication networks described above via the ePub viewer functionality 240 in a page-by-page or other manner.

Figure 6:
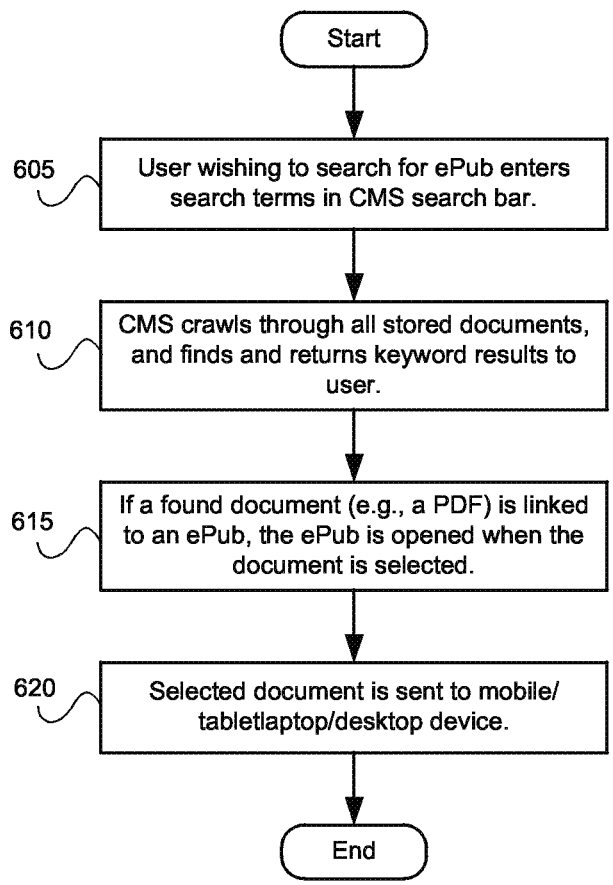
FIG. 6 illustrates a flowchart of an example method that enables a user of the ePub system to search for an ePub, in accordance a representative embodiment of the present invention.

FIG. 6 illustrates a flowchart 600 of an example method that enables a user of the ePub system 200 to search for an ePub, in accordance a representative embodiment of the present invention. The following description makes reference to elements of FIG. 1 and FIG. 2. In the example of FIG. 6, an individual at the user interface of a CMS such as the CMS 210 of FIG. 2 wishes to locate any ePubs within the ePub system 200 matching certain criteria.

The method of FIG. 6 begins at block 605, where the user of the ePub system 200 enters search terms into a "search bar" of the user interface of content management system such as the CMS 210. The content management system (e.g., CMS 210) then, at block 610, crawls through all stored documents and returns to the user keyword results found by the CMS 210. Next, at block 615, if a document such as, for example, a portable document format (PDF) that matches the search terms is found, and the found document is linked within the content management system (e.g., CMS 210) to an ePub, the ePub may be opened for viewing by the user, when the document (e.g. PDF document) is selected from the keyword results. Finally, at block 620, a selected document is sent to the mobile/tablet/laptop/desktop device of the user for viewing.

Figure 7:
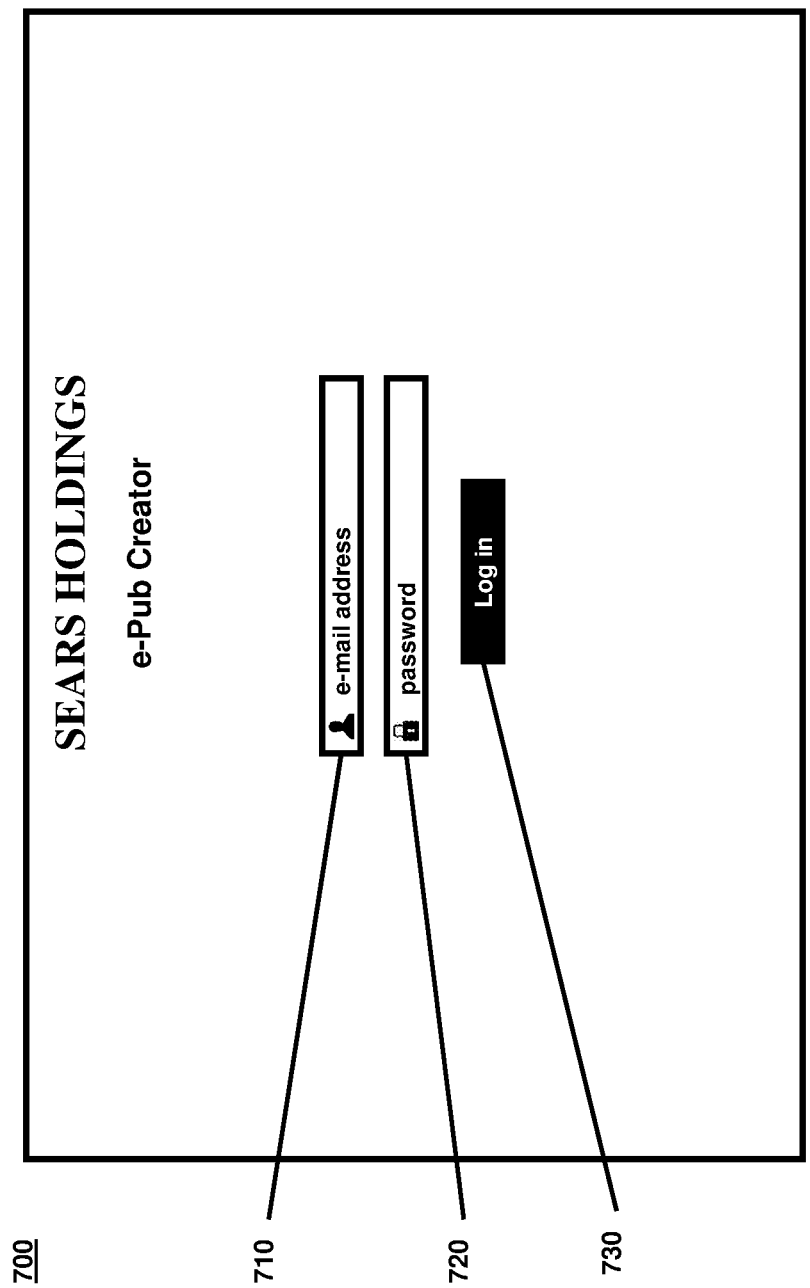
FIG. 7 is an illustration of an example user login screen of an ePub system such as the ePub system described herein with respect to FIGS. 2-6, in accordance with a representative embodiment of the present invention.

FIG. 7 is an illustration of an example user login screen 700 of an ePub system such as the ePub system 200 described herein with respect to FIGS. 2-6, in accordance with a representative embodiment of the present invention. As shown in the illustration of FIG. 7, the user login screen 700 comprises a user identifier 710, illustrated as an email address, a user password 720, and a login button 730 to request login to the ePub system 200 of FIG. 7.

Figure 8:
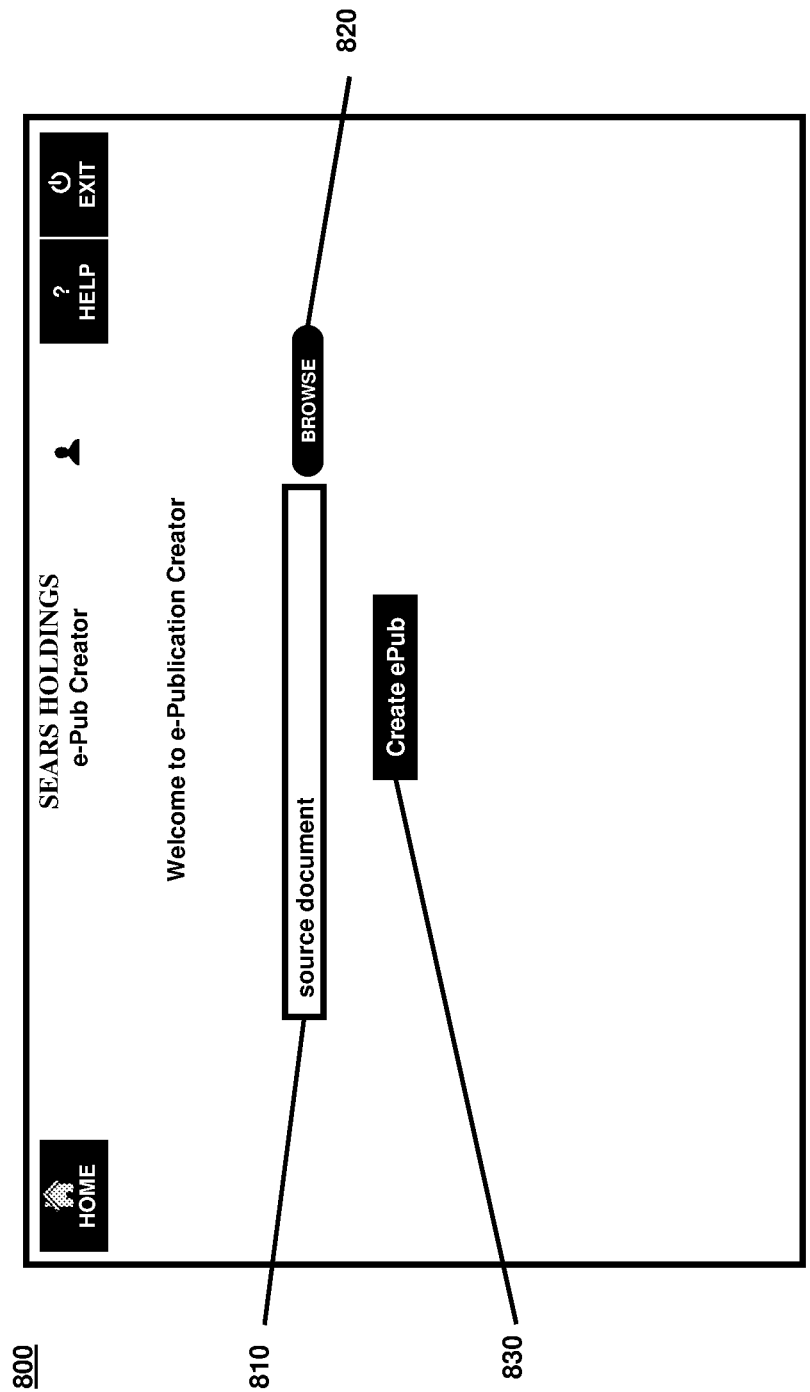
FIG. 8 is an illustration of an example ePub creation screen of an ePub system such as, for example, the ePub system described herein with respect to FIGS. 2-6, in accordance with a representative embodiment of the present invention.

FIG. 8 is an illustration of an example ePub creation screen 800 of an ePub system such as, for example, the ePub system 200 described herein with respect to FIGS. 2-6, in accordance with a representative embodiment of the present invention. As shown in the illustration of FIG. 8, the ePub creation screen 800 comprises a source document identifier text box 810, a "Browse" button 820, and a "Create ePub" button 830. The user of the ePub creation screen 800 may choose to explicitly indentify a source document by entering a file path in the source document identifier text box 810, or by using the "Browse" button 820 to cause display of a listing of possible source document names and locations from which to select. Following entry of a source document identifier in source document identifier text box 810 or selecting a source document from the listing of possible source document displayed by selecting the "Browse" button 820, the user may select the "Create ePub" button 830 to cause the ePub system 200 to begin production of a corresponding ePub.

Figure 9:
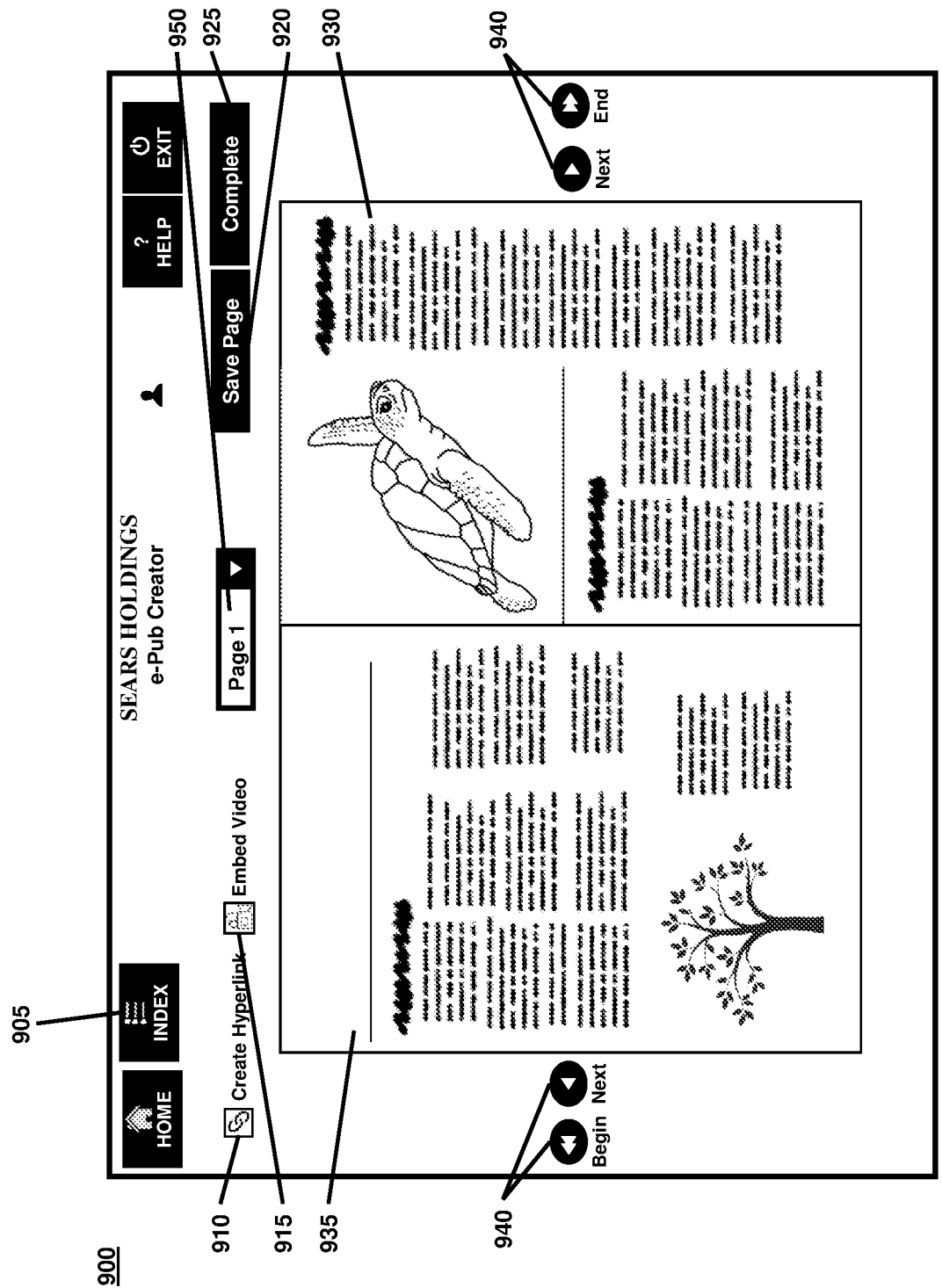
FIG. 9 is an illustration of an example ePub display screen showing left and right pages of an ePub produced by an ePub system such as the ePub system described herein with respect to FIGS. 2-6 that may be displayed following user selection of the "Create ePub" button of FIG. 8, in accordance with a representative embodiment of the present invention.

FIG. 9 is an illustration of an example ePub display screen 900 showing left and right pages 935, 930 of an ePub produced by an ePub system such as the ePub system 200 described herein with respect to FIGS. 2-6 that may be displayed following user selection of the "Create ePub" button 830 of FIG. 8, in accordance with a representative embodiment of the present invention. The ePub display screen 900 includes an "Index" button 905 to permit the user to display a pop-up window showing a scrollable collection of reduced-size page images for the current ePub. In addition, the ePub display screen 900 includes a "Create Hyperlink" button 910 to allow the user to create an end-user selectable link to other pages of the ePub or to media content such as, for example, one or more of video, audio, a still image, or content accessible via a web site such as YouTube®. The ePub display screen 900 also includes an "Embed Video" button 920 to enable the user to embed video content within the ePub. The example ePub display screen 900 further includes a "Save Page" button 920 to permit the user to save the displayed page(s) of the ePub, and a "Complete" button 925 to indicate that user customization of the ePub is finished. Finally, the ePub display screen 900 includes navigation buttons 940 for navigating to the beginning or end, or from page to page of the displayed ePub, and a page indicator and selection drop-down box 950, to permit the user to directly move to any of the pages of the displayed ePub.

Figure 10:
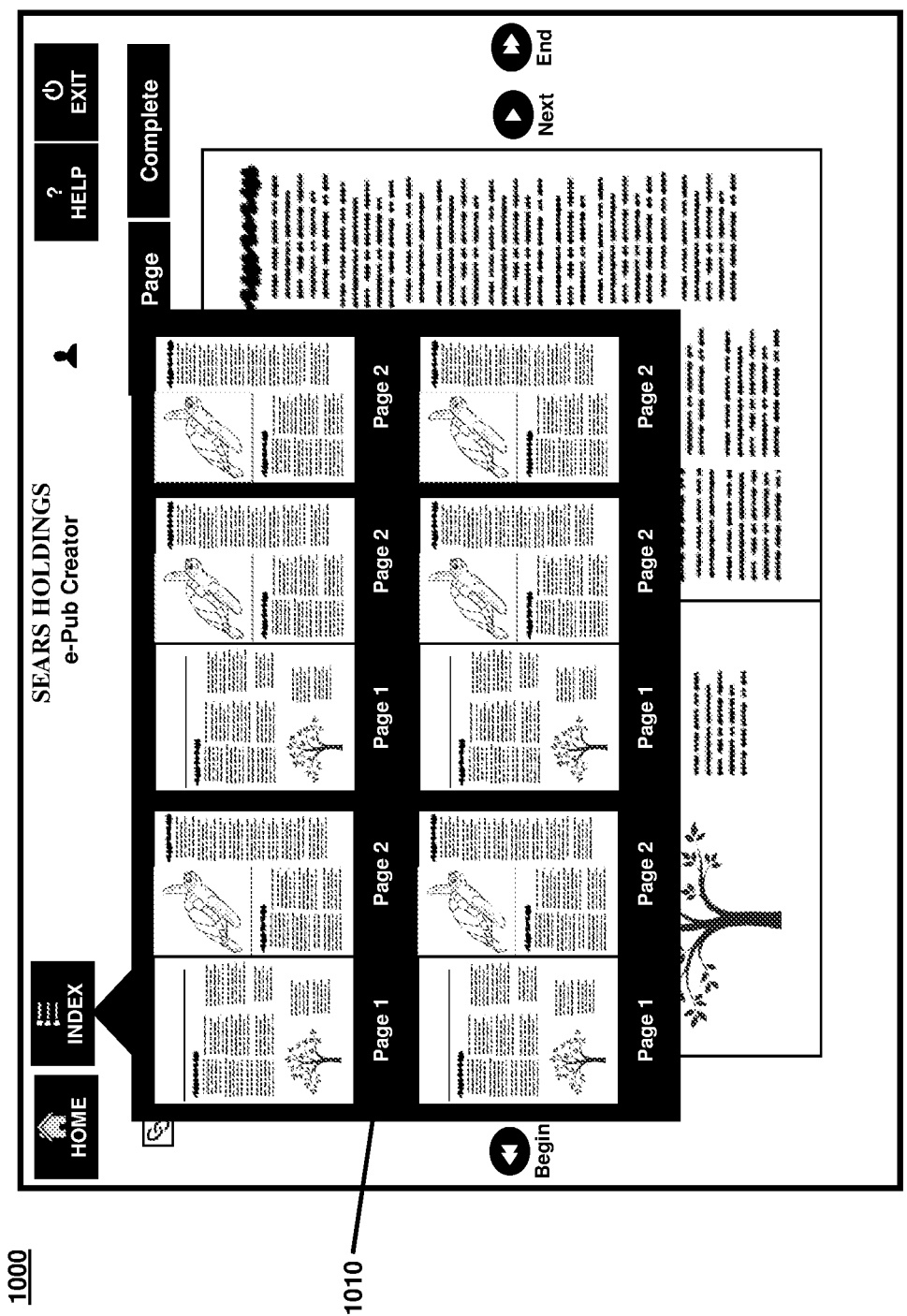
FIG. 10 is an illustration of an example index screen showing a list of reduced size images for an ePub such as that ePub display screen of FIG. 9 upon selection of the "Index" button, in accordance with a representative embodiment of the present invention.

FIG. 10 is an illustration of an example index screen 1000 showing a list of reduced size images for an ePub such as that ePub display screen 900 of FIG. 9 upon selection of the "Index" button 905, in accordance with a representative embodiment of the present invention. As shown in FIG. 10, the index screen 1000 identifies the ePub page corresponding to each reduced-size page image 1010, and may be scrollable by the user to enable display of images when all pages of the ePub cannot be represented on the index screen 1000.

Figure 11:
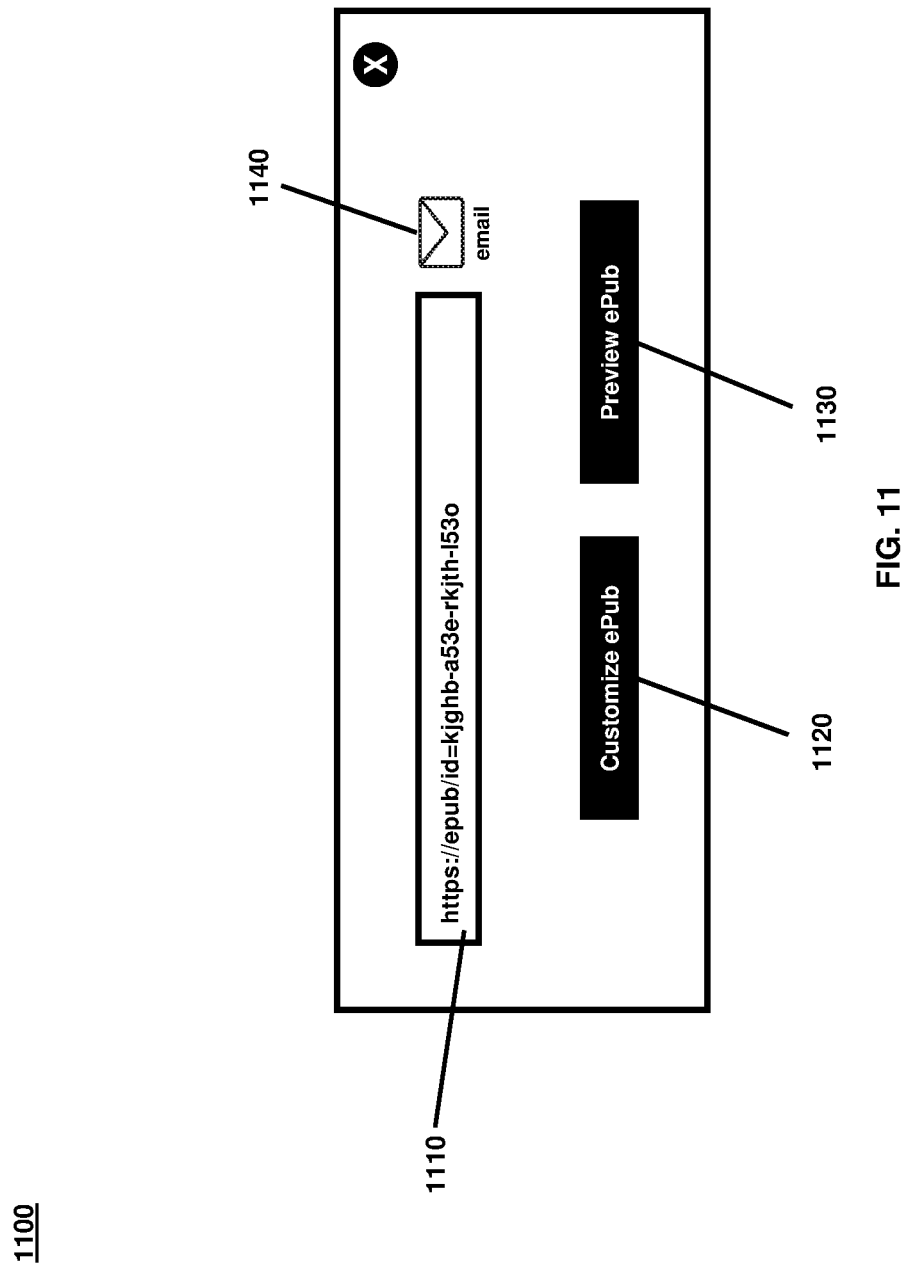
FIG. 11 is an illustration of an example ePub customize and preview screen of an ePub system such as the ePub system described herein with respect to FIGS. 2-6, in accordance with a representative embodiment of the present invention.

FIG. 11 is an illustration of an example ePub customize and preview screen 1100 of an ePub system such as the ePub system 200 described herein with respect to FIGS. 2-6, in accordance with a representative embodiment of the present invention. The customize and preview screen 1100 includes a link field 1110 that identifies a URL that may be shared with others to permit review of an ePub by selected others prior to publication of the ePub, and a "Customize ePub" button 1120 that permits the user to add content and links to an ePub following its creation from a source document (e.g., a PDF). The customize and preview screen 1100 also includes a "Preview ePub" button 1130, to allow the user to review an ePub as it will appear to the end-user, and an "email" button 1140, to allow the user to email the URL to be used by others to access the unpublished ePub for review.

The user may arrive at the customize and preview screen 1100 in several ways. For example, if the e-Pub was generated using, for example, the CMS 210, the user of the CMS 210 will be given an opportunity to customize the e-Pub before it is published. If the e-Pub is generated by logging directly into the e-Pub Creator application, after the ePub Creator functionality (e.g., ePub Creator functionality 220 of FIG. 2) converts the PDF to an e-Pub, the user is presented with a screen that gives them an option to customize the e-Pub, publish it, or email the URL of the in-progress e-Pub to one or more email addresses. Finally, if the creator of an ePub decides not publish the e-Pub when they first convert a source PDF to an ePub, they can go into the e-Pub Creator application (e.g., ePub Creator functionality 220) at a later time and view all "In-Progress" e-Pubs that they have created, and then choose one that they wish to customize. In addition, the system permits those with "Administrator" privileges to customize e-Pubs created by any user.

Figure 12:
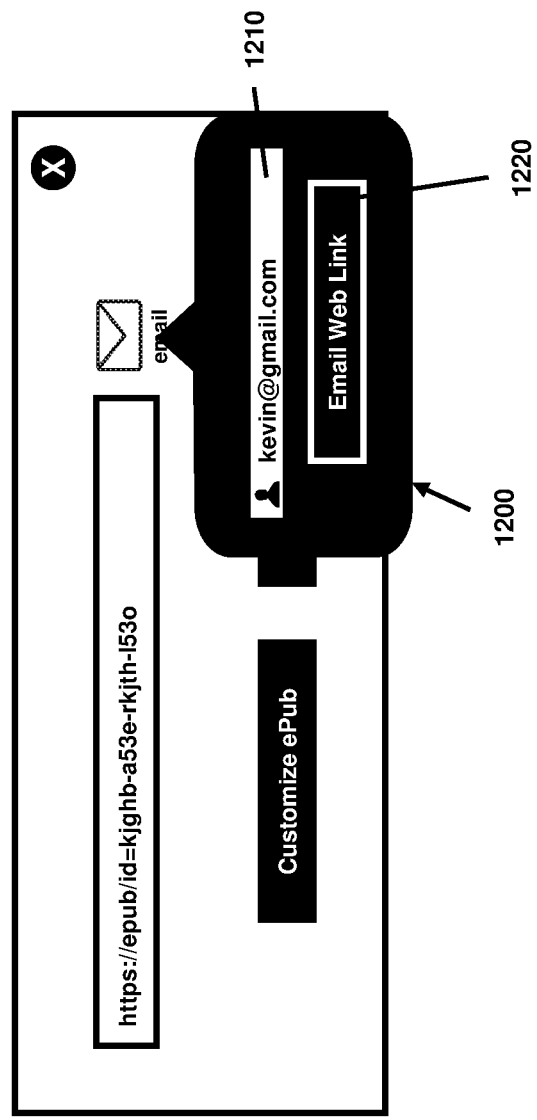
FIG. 12 is an illustration of an example email address entry window of an ePub system such as the ePub system described herein with respect to FIGS. 2-6, in accordance with a representative embodiment of the present invention.

FIG. 12 is an illustration of an example email address entry window 1200 of an ePub system such as the ePub system 200 described herein with respect to FIGS. 2-6, in accordance with a representative embodiment of the present invention. The email address pop-up window 1200 may be displayed by the ePub system 200 upon user selection of a user interface element such as the "email" button 1140 of FIG. 1100, discussed above. The email address entry pop-up window 1200 includes a email address field 1210 to permit identification of the intended recipient of the URL of the ePub to be reviewed, and a "Email Web Link" button 1220, which when selected causes the sending of an email containing the identified URL to the identified email address.

Figure 13:
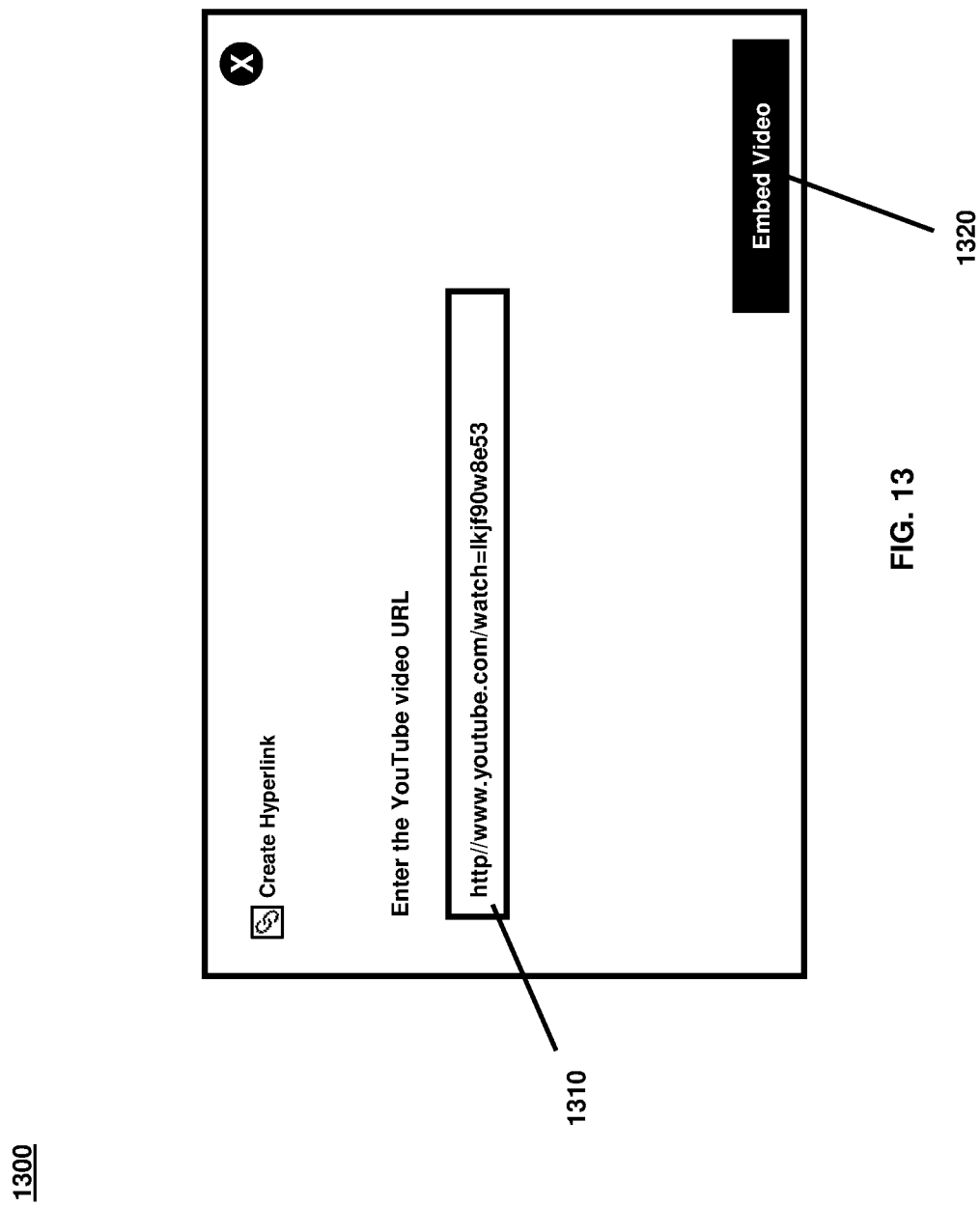
FIG. 13 illustrates an example embed video window of an ePub system such as the ePub system described herein with respect to FIGS. 2-6, in accordance with a representative embodiment of the present invention.

FIG. 13 illustrates an example embed video window 1300 of an ePub system such as the ePub system 200 described herein with respect to FIGS. 2-6, in accordance with a representative embodiment of the present invention. The embed video window 1300 includes a URL field 1310 used to identify the source of the video to be embedded in the current page of the ePub under customization, and an "Embed Video" button 1320 to cause embedding of the video retrieved from the source location identified by the URL field 1310 into the ePub being customized.

Figure 14:
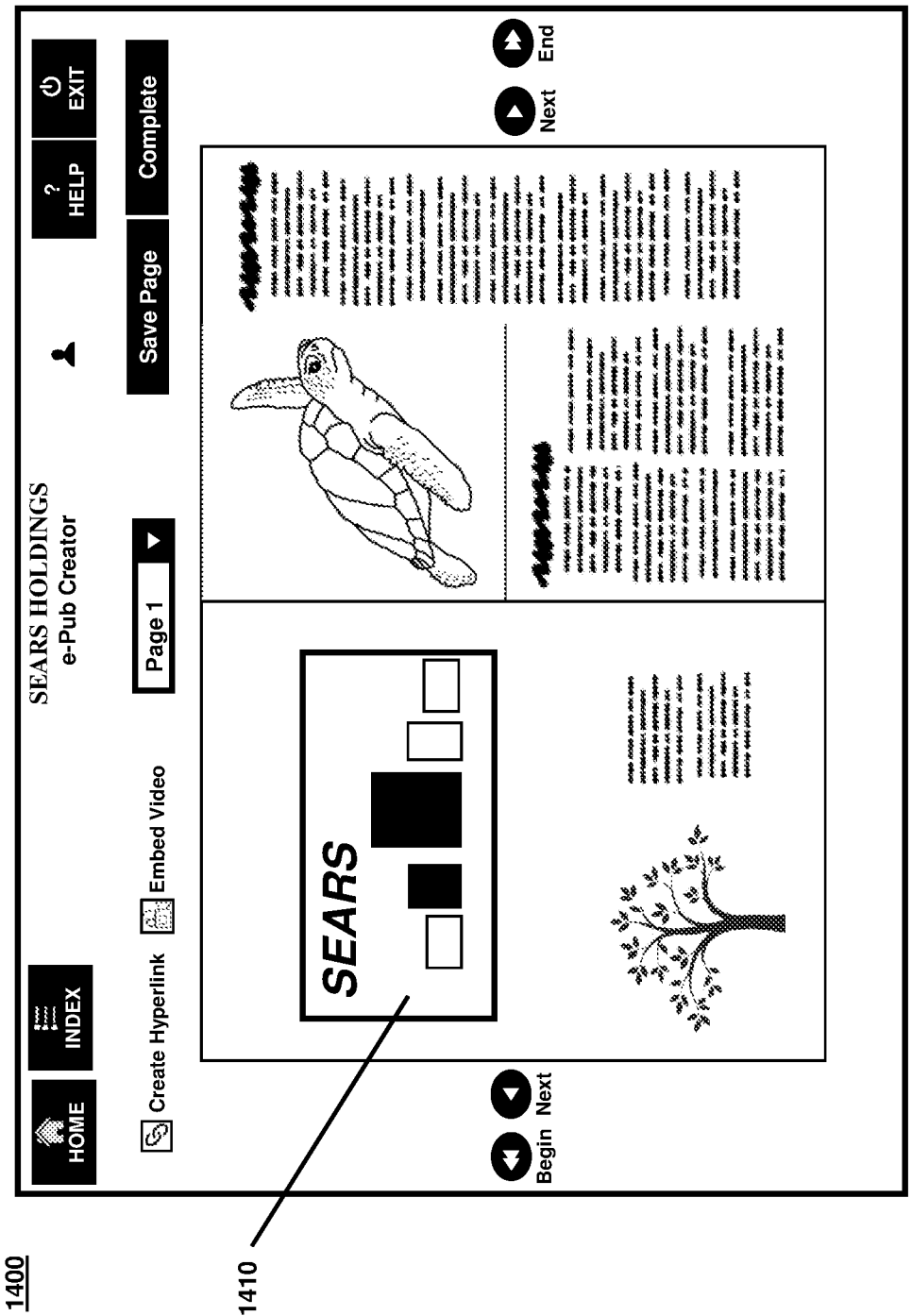
FIG. 14 is an illustration of an example ePub display screen, which may be similar to the ePub display screen of FIG. 9, and which has been customized to include an area for the display of video, following user selection of the "Embed Video" button as described above with respect to FIG. 13, in accordance with a representative embodiment of the present invention.

FIG. 14 is an illustration of an example ePub display screen 1400, which may be similar to the ePub display screen 900 of FIG. 9, and which has been customized to include an area 1410 for the display of video, following user selection of the "Embed Video" button 1320 as described above with respect to FIG. 13, in accordance with a representative embodiment of the present invention.

Figure 15:
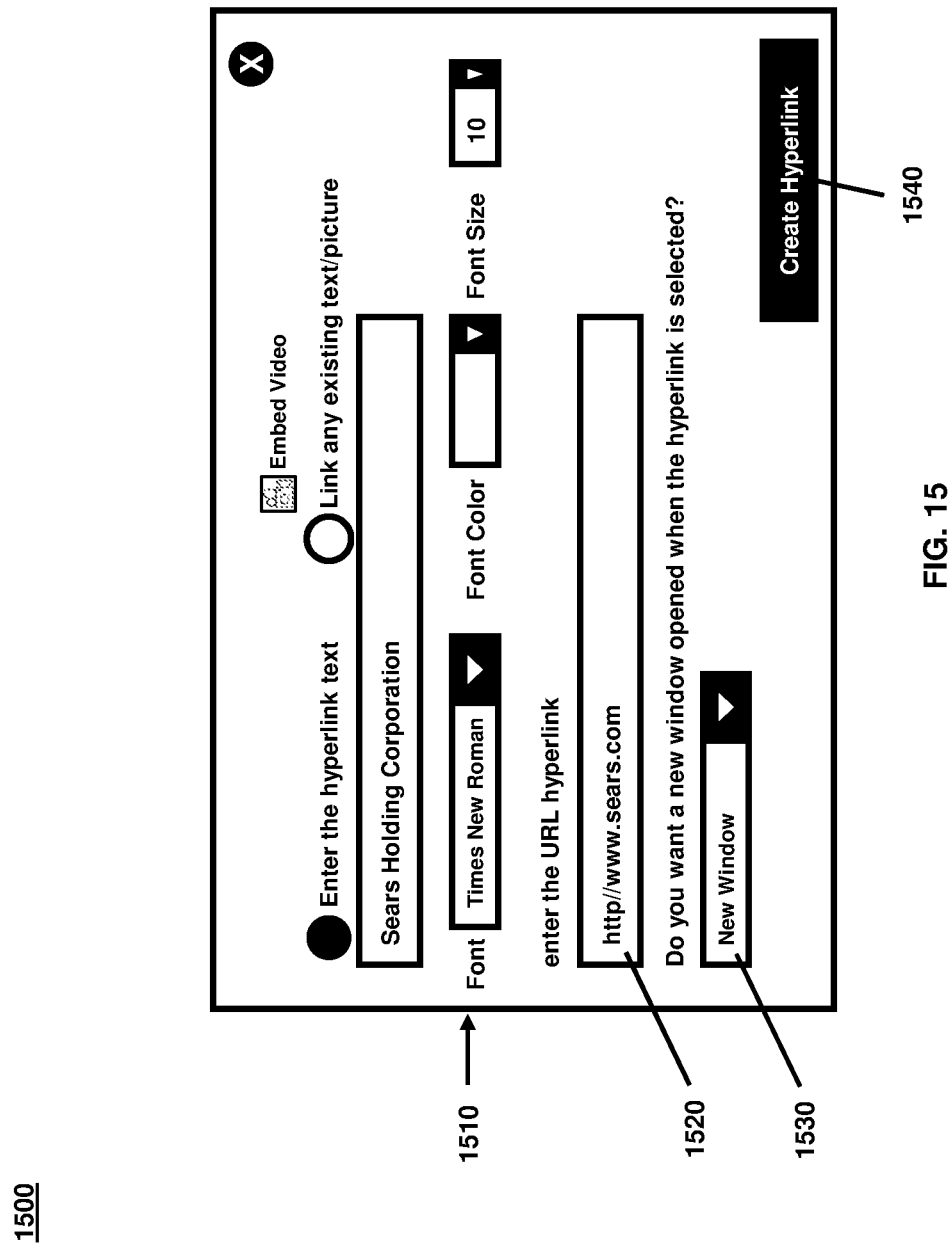
FIG. 15 shows an example create hyperlink window of an ePub system such as the ePub system described herein with respect to FIGS. 2-6, in accordance with a representative embodiment of the present invention.

FIG. 15 shows an example create hyperlink window 1500 of an ePub system such as the ePub system 200 described herein with respect to FIGS. 2-6, in accordance with a representative embodiment of the present invention. The create hyperlink window 1500 includes, among other things, dropdown boxes 1510 that allow the user to select a font, a font color, and a font size in which the hyperlink is to be represented on the selected page of the ePub being customized, a text box 1520 that permits the user to specify the URL hyperlink to be placed on the selected page, and an option 1530 to indicate whether a new window should be opened when the hyperlink is selected by the end-user viewing the ePub page. User selection of the "Create Hyperlink" button 1540 causes the specified hyperlink to be added to the currently displayed page of the ePub.

Figure 16:
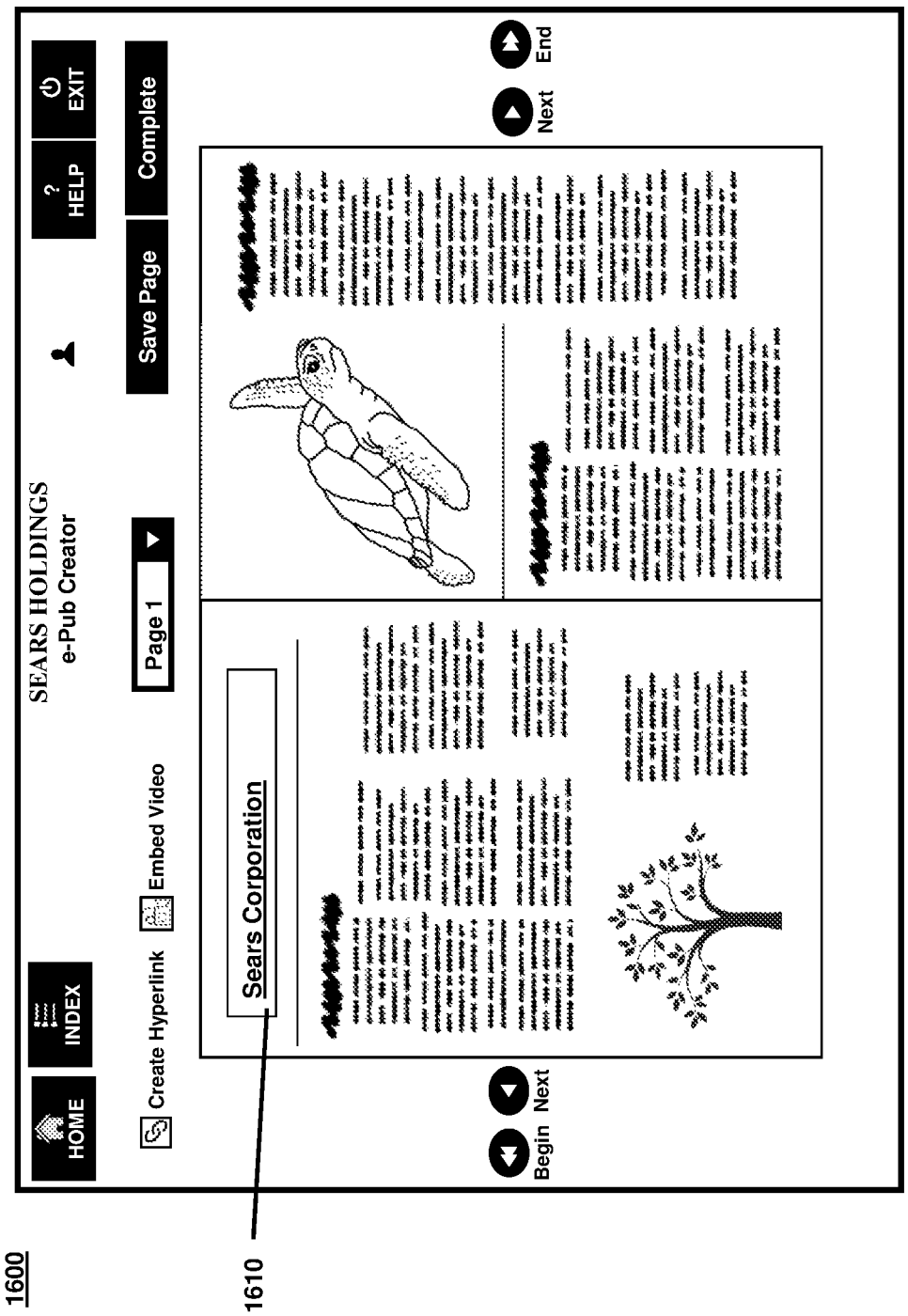
FIG. 16 is an illustration of an example ePub display screen, which may be similar to the ePub display screen of FIG. 9, and which has been customized to include a hyperlink to permit user access to a specified URL, following user selection of the "Create Hyperlink" button as described above with respect to FIG. 15, in accordance with a representative embodiment of the present invention.

FIG. 16 is an illustration of an example ePub display screen 1600, which may be similar to the ePub display screen 900 of FIG. 9, and which has been customized to include a hyperlink 1610 to permit user access to a specified URL, following user selection of the "Create Hyperlink" button 910 as described above with respect to FIG. 15, in accordance with a representative embodiment of the present invention.

Figure 17:
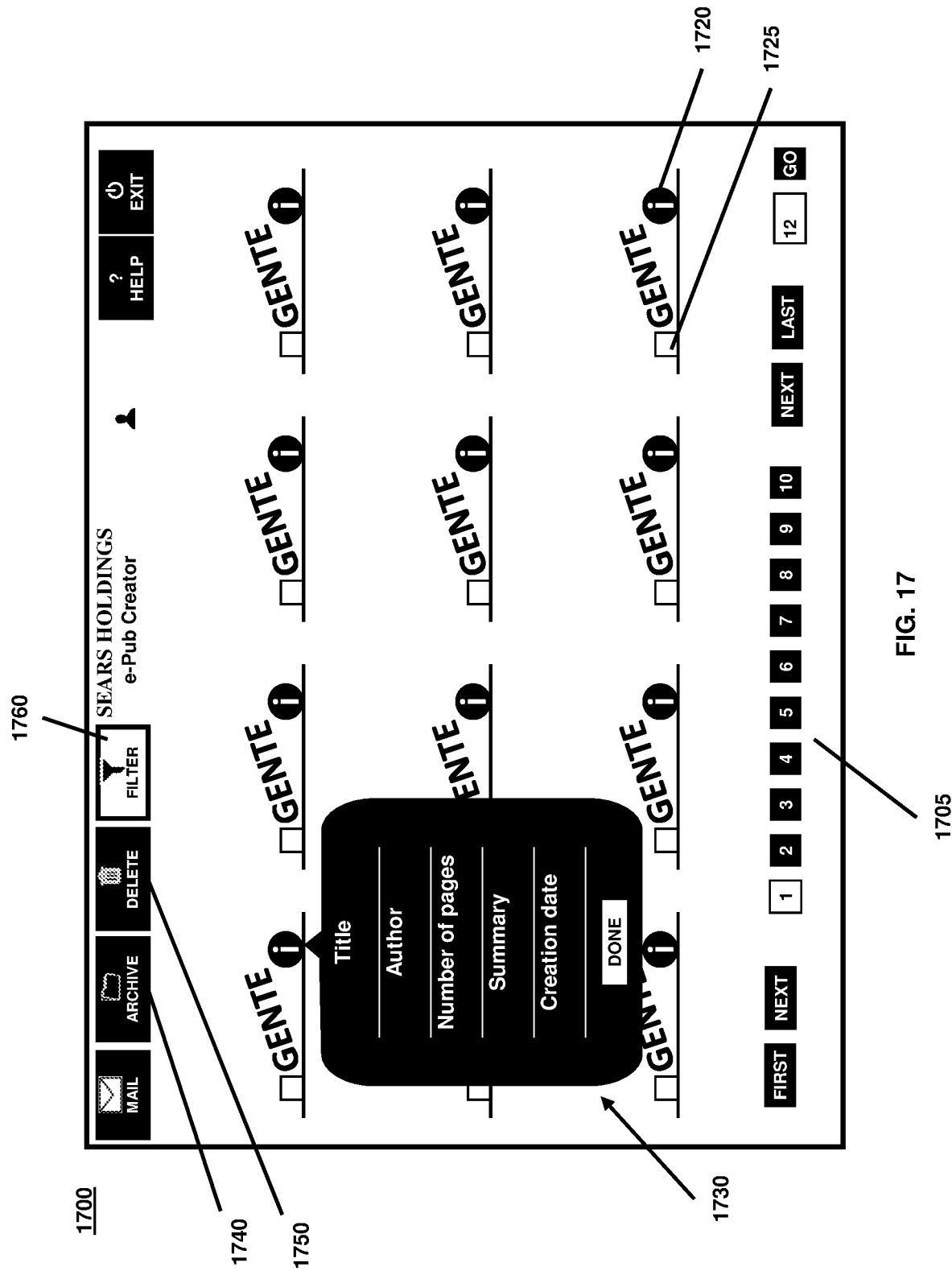
FIG. 17 is an illustration of an example file management screen of an ePub system such as the ePub system described herein with respect to FIGS. 2-6, in accordance with a representative embodiment of the present invention.

FIG. 17 is an illustration of an example file management screen 1700 of an ePub system such as the ePub system 200 described herein with respect to FIGS. 2-6, in accordance with a representative embodiment of the present invention. As shown in FIG. 17, the file management screen 1700 displays a group of graphic representations of ePubs, where the user may select any of a number of groups of ePubs from a larger collection of ePubs, using group selectors 1705. The representation of each ePub displayed is accompanied by an information button 1720 and a selection box 1725. The information button 1720 permits the user to display a information window 1730 that provides the user with additional details about that ePub. The selection box 1725 for each ePub may be set to indicate which of the ePubs represented on the file management screen 1700 are to be operated upon when the "Archive" button 1740 and the "Delete" button 1750 are selected by the user. User selection of the "Archive" button 1740 causes the ePubs with selection boxes 1725 set to be archived, while user selection of the "Delete" button 1750 causes the ePubs with selection boxes 1725 set to be deleted. The file management screen 1700 also includes a "Filter" button 1760 that permits the user to select the ePubs for which graphic representations will be displayed such as, for example, all published ePubs, or only those ePubs published by the individual logged in and identified at the top of file management screen 1700.

Figure 18:
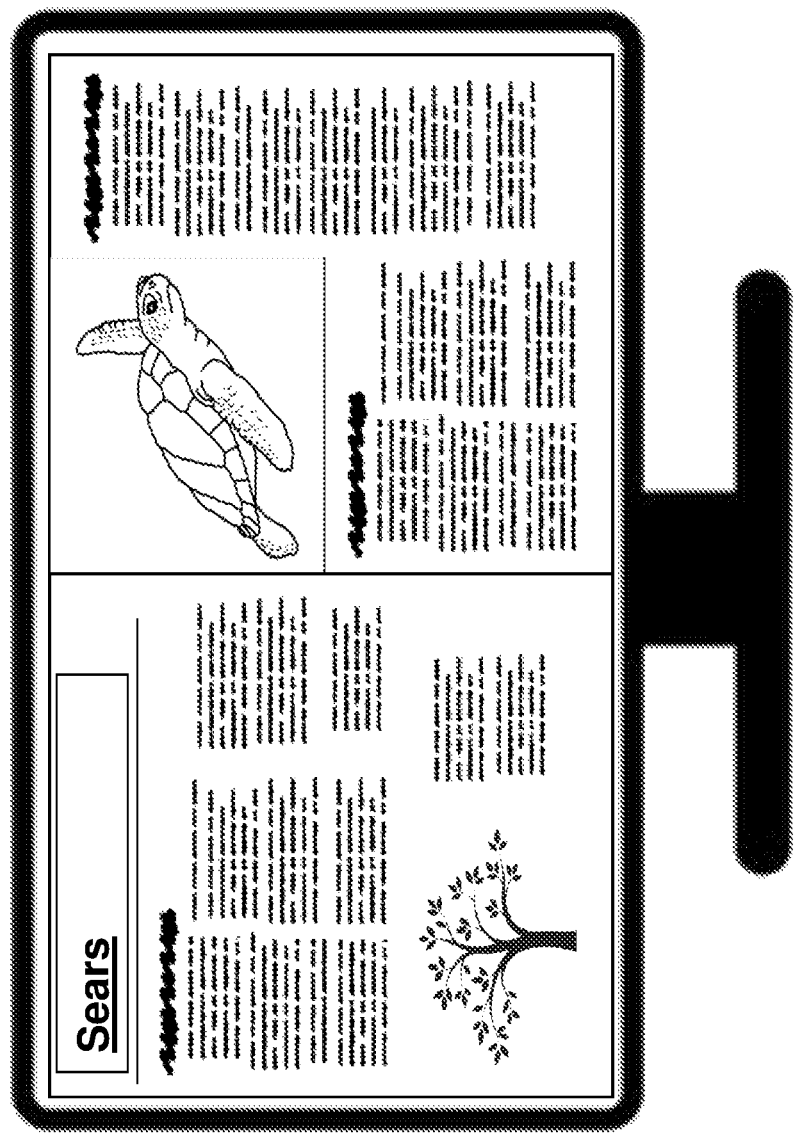
FIG. 18 is an illustration of an example display screen image showing the appearance of an ePub as rendered by an Internet browser on a flat panel display of a personal computer from data (e.g., HTML 5 content) produced by the ePub viewer functionality of FIG. 2, in accordance with a representative embodiment of the present invention.

FIG. 18 is an illustration of an example display screen image 1800 showing the appearance of an ePub, as rendered by an Internet browser on a flat panel display of a personal computer from data (e.g., HTML 5 content) produced by the ePub viewer functionality 220 of FIG. 2, in accordance with a representative embodiment of the present invention.

FIG. 19 is an illustration of an example display screen image 1910 showing the appearance of an ePub, as rendered on a display of a tablet computer 1900 from data (e.g., HTML 5 content) produced by the ePub viewer functionality 220 of FIG. 2, in accordance with a representative embodiment of the present invention.

FIG. 20 is an illustration of an example display screen image 2010 showing the appearance of an ePub, as rendered on a display of a smart phone 2000 from data (e.g., HTML 5 content) produced by the ePub viewer functionality 220 of FIG. 2, in accordance with a representative embodiment of the present invention.

FIGS. 21-26 are illustrations of example display screen images for a smart phone connected to an ePub system such as the ePub system 200 described herein with respect to FIGS. 2-6, in accordance with a representative embodiment of the present invention.

Figure 21:
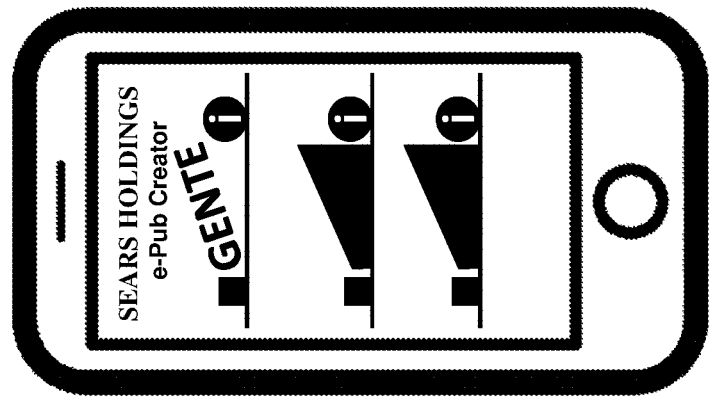
FIG. 21 is an illustration showing an exemplary catalog view of published e-Pubs as it may appear on the display of a smart phone, in accordance with a representative embodiment of the present invention.

FIG. 21 is an illustration showing an exemplary catalog view of published e-Pubs as it may appear on the display of a smart phone, in accordance with a representative embodiment of the present invention.

Figure 22:
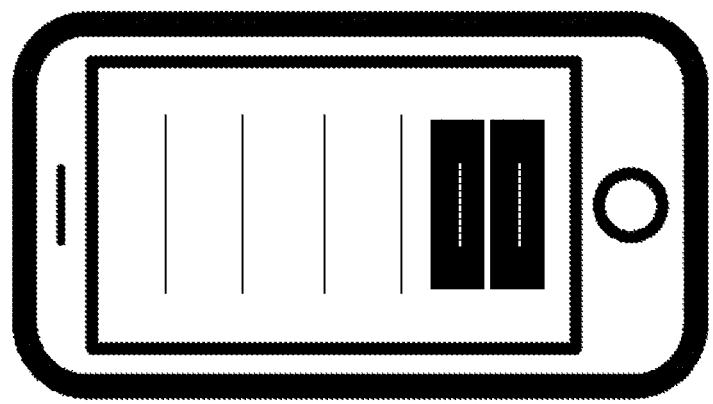
FIG. 22 is an illustration showing an exemplary detailed information screen for an individual e-Pub (e.g., identifying the creator, ePub name, date of last update) as it may appear on the display of a smart phone, and that may be accessed by user selection of an information icon or button such as the information button 1720 of FIG. 17, in accordance with a representative embodiment of the present invention.

FIG. 22 is an illustration showing an exemplary detailed information screen for an individual e-Pub (e.g., identifying the creator, ePub name, date of last update) as it may appear on the display of a smart phone, and that may be accessed by user selection of an information icon or button such as the information button 1720 of FIG. 17, in accordance with a representative embodiment of the present invention.

Figure 23:
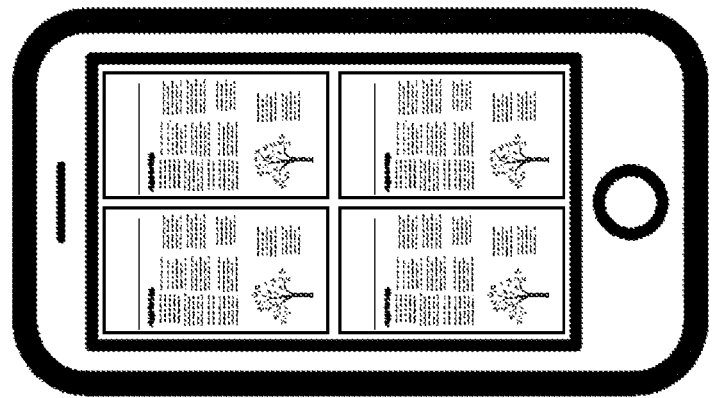
FIG. 23 is an illustration showing an exemplary e-Pub viewing screen as it may appear on the display of a smart phone when the user clicks-on/selects a "View e-Pub" link such as that in FIG. 22, in accordance with a representative embodiment of the present invention.

FIG. 23 is an illustration showing an exemplary e-Pub viewing screen as it may appear on the display of a smart phone when the user clicks-on/selects a "View e-Pub" link such as that in FIG. 22, in accordance with a representative embodiment of the present invention.

Figure 24:
FIG. 24 is an illustration of an exemplary zoomed-in view of an ePub, as it may appear on the display of a smart phone, in accordance with a representative embodiment of the present invention.

FIG. 24 is an illustration of an exemplary zoomed-in view of an ePub, as it may appear on the display of a smart phone, in accordance with a representative embodiment of the present invention.

Figure 25:
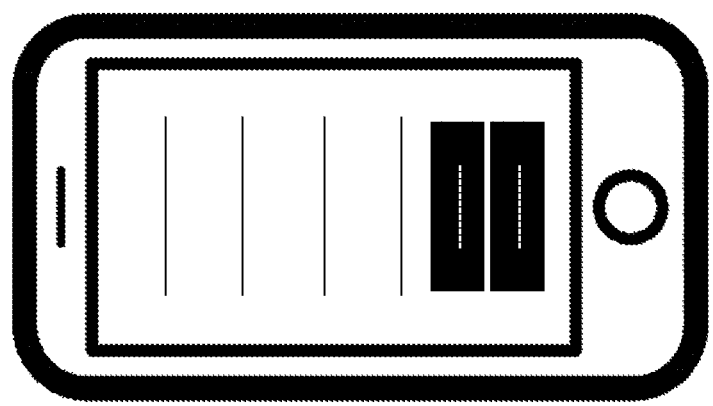
FIG. 25 is an illustration of an exemplary search results screen as it may appear on the display of a smart phone when an end-user searches for a keyword, in accordance with a representative embodiment of the present invention.

FIG. 25 is an illustration of an exemplary search results screen as it may appear on the display of a smart phone when an end-user searches for a keyword, in accordance with a representative embodiment of the present invention.

Figure 26:
FIG. 26 is an illustration of an exemplary ePub screen as it may appear on the display of a smart phone after an end-user clicks on/selects one of the results shown in a search results screen such as, for example, that shown in FIG. 25, in accordance with a representative embodiment of the present invention.

FIG. 26 is an illustration of an exemplary ePub screen as it may appear on the display of a smart phone after an end-user clicks on/selects one of the results shown in a search results screen such as, for example, that shown in FIG. 25, in accordance with a representative embodiment of the present invention.

Aspects of the present invention may be seen in a method of operating a system for producing an electronic publication (ePub). Such a method may comprise receiving a first source document comprising a plurality of pages of textual content in a first human readable language, and processing the first source document to produce a first plurality of individual page images and corresponding searchable text pages. The method may also comprise associating the first plurality of individual page images and the corresponding searchable text pages in storage as an ePub in the first human readable language, and delivering, on demand, one or more of the first plurality of individual page images to an end-user display device in a page by page manner via a communication network. The first source document may comprise a portable document format (PDF) file. The processing may comprise parsing the first source document to produce a first plurality of page image files, each having a corresponding text page, and the processing may comprise tracking translation of the first source document to a second source document comprising textual content in a second human readable language. The processing may also comprise modifying one or more of the first plurality of individual page images to include one or both of: embedded media content and a hyperlink to media content stored remotely from the ePub system. The media content may comprise a digital representation of one or more of video, audio, and/or a still picture.

In some representative embodiments of the present invention, the processing may comprise transmitting, to a translator of human readable languages, information identifying the first source document and a second human readable language, and receiving, from the translator, a second source document in the second human readable language, and the method may comprise processing the second source document to produce a second plurality of individual page images and corresponding searchable text pages, and associating the second plurality of individual page images and the corresponding searchable text pages in storage as an ePub in the second human readable language. In some representative embodiments of the present invention, the method may comprise associating the ePub in the first human readable language with the ePub in the second human readable language, in storage. The translator may be human. Further, the delivering may comprise encoding each page of the ePub in the first human readable language, using a hypertext markup language.

Further aspects of the present invention may be seen in a system for producing an electronic publication (ePub), where the system comprises at least one processor communicatively coupled to a communication network, the at least one processor operable to, at least, perform the method described above.

In addition, aspects of the present invention may be observed in a non-transitory computer-read medium having a plurality of code sections, each code section comprising a plurality of instructions executable by a processor, the instructions causing the processor to perform actions of the method of operating a system for producing an electronic publication (ePub) described above.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, the method comprising:
processing a first source document, via a device and an application, to produce an electronic publication (ePub) comprising a first plurality of individual page images;
replacing the first source document with the ePub according to a request from the device over a remote communication link; and
delivering one or more of the first plurality of individual page images, on demand, to an end-user display device in a page by page manner, wherein:
the application is not installed on the device,
a content management system stores the first source document and the ePub,
the remote communication link communicatively couples the device with the content management system,
the ePub is linked to an identifier of the first source document, and
the ePub is linked to a status.

2. The method according to claim 1, wherein:
the processing comprises parsing the first source document to produce a first plurality of page image files, and
each page image file of the first plurality of page image files corresponds to a text page.

3. The method according to claim 1, wherein the ePub is viewable from the end-user display device without downloading the entire ePub and without the application being resident on the end-user display device.

4. The method according to claim 1, wherein:
the processing comprises modifying one or more of the first plurality of individual page images by adding embedded media content and a hyperlink to media content stored remotely from the system, and
the media content comprises a digital representation of one or more of video, audio, and a still picture.

5. The method according to claim 1, comprising:
receiving a plurality of search terms;
searching a plurality of documents according to the plurality of search terms;
providing a search result indicative of a particular document;
determining whether the particular document is associated with the ePub; and
providing access to the ePub according to the association.

6. The method according to claim 1, wherein the processing comprises:
transmitting, to a translator of human readable languages, information identifying the first source document in a first human readable language; and
receiving, from the translator, a second source document in a second human readable language.

7. The method according to claim 6, wherein the method comprises:
processing the second source document to produce a second plurality of individual page images; and
associating the second plurality of individual page images in storage as a new ePub in the second human readable language.

8. The method according to claim 7, wherein the method comprises:
associating the ePub in the first human readable language with the new ePub in the second human readable language, in storage.

9. The method according to claim 6, wherein the translator is a human.

10. The method according to claim 1, wherein the delivering comprises encoding each page of the ePub in a first human readable language, using a hypertext markup language.

11. A system, the system comprising:
at least one processor on a device communicatively coupled to a communication network, the at least one processor operable to, at least:
process a first source document to produce an electronic publication (ePub) comprising a first plurality of individual page images;
associate the first plurality of individual page images in storage as the ePub;
replace the first source document with the ePub according to a request from the device over a remote communication link; and
deliver, on demand, one or more of the first plurality of individual page images to an end-user display device in a page by page manner via a communication network, wherein:
a content management system stores the first source document and the ePub,
the remote communication link communicatively couples the device with the content management system,
the ePub is linked to an identifier of the first source document, and
the ePub is linked to a status.

12. The system according to claim 11, wherein the at least one processor is operable to, at least:
parse the first source document to produce a first plurality of page image files, wherein each page image file of the first plurality of page image files corresponds to a text page.

13. The system according to claim 11, wherein the ePub is viewable from the end-user display device without downloading the entire ePub and without an application used to create the ePub being resident on the end-user display device.

14. The system according to claim 11, wherein the at least one processor is operable to, at least:
modify one or more of the first plurality of individual page images by adding embedded media content and a hyperlink to media content stored remotely from the system, wherein the media content comprises a digital representation of one or more of video, audio, and a still picture.

15. The system according to claim 11, wherein the at least one processor is operable to, at least:
receive a plurality of search terms;
search a plurality of documents according to the plurality of search terms;
provide a search result indicative of a particular document;
determine whether the particular document is associated with the ePub; and
provide access to the ePub according to the association.

16. The system according to claim 11, wherein the at least one processor is operable to, at least:
transmit, to a translator of human readable languages, information identifying the first source document in a first human readable language; and
receive, from the translator, a second source document in a second human readable language.

17. The system according to claim 16, wherein the at least one processor is operable to, at least:
   process the second source document to produce a second plurality of individual page images; and
   associate the second plurality of individual page images in storage as a new ePub in the second human readable language.

18. The system according to claim 17, wherein the at least one processor is operable to, at least:
   associate the ePub in the first human readable language with the new ePub in the second human readable language, in storage.

19. The system according to claim 16, wherein the translator is a human.

20. The system according to claim 11, wherein the at least one processor is operable to, at least:
   encode each page of the ePub in a first human readable language, using a hypertext markup language.

* * * * *